(12) United States Patent
Liu et al.

(10) Patent No.: US 11,924,873 B2
(45) Date of Patent: Mar. 5, 2024

(54) CONTENTION WINDOW ADJUSTMENT FOR NEW RADIO UNLICENSED/SIDELINK

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/151,105

(22) Filed: Jan. 15, 2021

(65) Prior Publication Data

US 2022/0232625 A1 Jul. 21, 2022

(51) Int. Cl.
*H04W 74/08* (2009.01)
(52) U.S. Cl.
CPC .............. *H04W 74/0808* (2013.01)
(58) Field of Classification Search
None
See application file for complete search history.

(56) References Cited

U.S. PATENT DOCUMENTS

| | | | |
|---|---|---|---|
| 2017/0079010 A1 | 3/2017 | Zhang et al. | |
| 2017/0079013 A1* | 3/2017 | Noh | H04L 1/187 |
| 2018/0027590 A1* | 1/2018 | Yerramalli | H04W 76/28 370/328 |
| 2019/0182865 A1* | 6/2019 | Falahati | H04W 74/004 |
| 2019/0215866 A1 | 7/2019 | Falahati et al. | |
| 2020/0053777 A1* | 2/2020 | Babaei | H04W 72/04 |
| 2020/0404708 A1* | 12/2020 | Zhang | H04W 16/14 |
| 2021/0297193 A1* | 9/2021 | Noh | H04L 1/1614 |
| 2021/0297199 A1* | 9/2021 | Miao | H04B 7/0695 |
| 2022/0264646 A1* | 8/2022 | Wang | H04W 74/006 |

FOREIGN PATENT DOCUMENTS

| | | |
|---|---|---|
| EP | 3905829 A1 | 11/2021 |
| WO | WO-2020139047 A1 | 7/2020 |

OTHER PUBLICATIONS

International Search Report and Written Opinion—PCT/US2021/072883—ISA/EPO—dated Mar. 25, 2022.
(Continued)

*Primary Examiner* — Rebecca E Song
(74) *Attorney, Agent, or Firm* — Holland & Hart LLP

(57) ABSTRACT

Methods, systems, and devices for wireless communications are described. A transmitting device may perform a first transmission to one or more receiving devices, the first transmission associated with a transmission type. The transmitting device may determine a feedback response for the first transmission based on monitoring for feedback messages from the one or more receiving devices in response to the first transmission. The transmitting device may select a contention window size for performing one or more subsequent transmissions based at least in part on the feedback response and the transmission type. The transmitting device may perform the one or more subsequent transmissions in accordance with a clear channel assessment procedure using the selected contention window size.

15 Claims, 14 Drawing Sheets

(56) References Cited

OTHER PUBLICATIONS

Kim S.W., et al., "Efficient Retransmission Methods in Wireless MAC Protocol for Multicast", Wireless Personal Communications, Kluwer Academic Publishers, DO, vol. 63, No. 3, Sep. 26, 2010 (Sep. 26, 2010), pp. 613-626, XP035024143, ISSN: 1572-834X, DOI: 10.1007/S11277-010-0154-X, Section 3.1 "Contention Window Adjustment", pp. 616-617.

* cited by examiner

CONTENTION WINDOW ADJUSTMENT FOR NEW RADIO UNLICENSED/SIDELINK

FIELD OF TECHNOLOGY

The following relates to wireless communications, including contention window adjustment for new radio unlicensed/sidelink.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support contention window adjustment for new radio unlicensed/sidelink. Generally, the described techniques provide various mechanisms that support wireless communications in a wireless network. Broadly, aspects of the described techniques support various mechanisms for hybrid automatic repeat/request (HARQ) feedback rules to be adopted that are on a transmission-type basis. The rules are specific to particular transmission type(s) and the transmitting device adjusts the contention window size based on the presence/absence, and/or content of acknowledgement/negative-acknowledgement (ACK/NACK, or more simply A/N) feedback messages. Accordingly, the transmitting device may perform wireless transmissions using a specific transmission type and/or a mixture of different transmission types and then update its contention window size based on the presence or absence of A/N feedback messages and/or the content of received feedback messages. For example, the transmitting device may reset, maintain, or increase its contention window size based on the HARQ feedback. Accordingly, the transmitting device may be better able to adapt its clear channel assessment (CCA) procedures using contention window sizes based on more accurate channel properties.

A method for wireless communication at a transmitting device is described. The method may include performing a first transmission to one or more receiving devices, the first transmission associated with a transmission type, determining a feedback response for the first transmission based on monitoring for feedback messages from the one or more receiving devices in response to the first transmission, selecting a contention window size for performing one or more subsequent transmissions based on the feedback response and the transmission type, and performing the one or more subsequent transmissions in accordance with a CCA procedure using the selected contention window size.

An apparatus for wireless communication at a transmitting device is described. The apparatus may include a processor, memory in electronic communication with the processor, and instructions stored in the memory. The instructions may be executable by the processor to cause the apparatus to perform a first transmission to one or more receiving devices, the first transmission associated with a transmission type, determine a feedback response for the first transmission based on monitoring for feedback messages from the one or more receiving devices in response to the first transmission, select a contention window size for performing one or more subsequent transmissions based on the feedback response and the transmission type, and perform the one or more subsequent transmissions in accordance with a CCA procedure using the selected contention window size.

Another apparatus for wireless communication at a transmitting device is described. The apparatus may include means for performing a first transmission to one or more receiving devices, the first transmission associated with a transmission type, means for determining a feedback response for the first transmission based on monitoring for feedback messages from the one or more receiving devices in response to the first transmission, means for selecting a contention window size for performing one or more subsequent transmissions based on the feedback response and the transmission type, and means for performing the one or more subsequent transmissions in accordance with a CCA procedure using the selected contention window size.

A non-transitory computer-readable medium storing code for wireless communication at a transmitting device is described. The code may include instructions executable by a processor to perform a first transmission to one or more receiving devices, the first transmission associated with a transmission type, determine a feedback response for the first transmission based on monitoring for feedback messages from the one or more receiving devices in response to the first transmission, select a contention window size for performing one or more subsequent transmissions based on the feedback response and the transmission type, and perform the one or more subsequent transmissions in accordance with a CCA procedure using the selected contention window size.

In some examples of the method, apparatuses, and non-transitory computer-readable medium described herein, and the method, apparatuses, and non-transitory computer-readable medium may include further operations, features, means, or instructions for determining that no feedback messages were received from the one or more receiving devices for the first transmission, determining that a second transmission was multiplexed with the first transmission during a same slot, the second transmission associated with a different transmission type, and selecting, based on receiving at least one feedback message for the second transmission, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that no feedback messages were received from the one or more receiving devices, determining that no second transmission types were multiplexed with the first transmission during a same slot, and maintaining, based on no feedback messages and no second transmission types being multiplexed with the first transmission during the same slot, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that at least one NACK feedback message was received from the one or more receiving devices and resetting, based on the at least one NACK feedback message, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that at least one feedback message was received and resetting, based on the at least one feedback message, the contention window size for performing the one or more subsequent transmissions.

In some examples of the method, apparatuses, and non-transitory computer-readable medium described herein, the at least one feedback message includes at least one NACK feedback message, at least one ACK feedback message, or both.

In some examples of the method, apparatuses, and non-transitory computer-readable medium described herein, and the method, apparatuses, and non-transitory computer-readable medium may include further operations, features, means, or instructions for determining that no feedback messages were received and increasing, based on the no feedback messages, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that at least one ACK feedback message was received and resetting, based on the at least one ACK feedback message, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that no feedback messages were received or that a NACK feedback message was received from the one or more receiving devices and increasing, based on the no feedback messages or the NACK feedback message, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that at least one ACK feedback message, at least one NACK feedback message, or both, were received from the one or more receiving devices and resetting, based on the at least one ACK feedback message, the at least one NACK feedback message, or both, the contention window size for performing the one or more subsequent transmissions.

Some examples of the method, apparatuses, and non-transitory computer-readable medium described herein may further include operations, features, means, or instructions for applying a weighting factor to one or more NACK feedback messages received from the one or more receiving devices, where resetting the contention window size for performing the one or more subsequent transmissions based on the weighting factor.

In some examples of the method, apparatuses, and non-transitory computer-readable medium described herein, and the method, apparatuses, and non-transitory computer-readable medium may include further operations, features, means, or instructions for determining that at least one ACK feedback message, at least one NACK feedback message, or both, were received from the one or more receiving devices, determining that a ratio of ACK feedback messages, NACK messages, or both, to an expected feedback message count satisfies a threshold, and resetting, based on the ratio satisfying the threshold, the contention window size for performing the one or more subsequent transmissions.

Some examples of the method, apparatuses, and non-transitory computer-readable medium described herein may further include operations, features, means, or instructions for applying a weighting factor to each received NACK feedback message to obtain a discounted NACK feedback messages, where determining that a ratio satisfies the threshold may be based on the ACK feedback message and the discounted NACK feedback messages.

In some examples of the method, apparatuses, and non-transitory computer-readable medium described herein, and the method, apparatuses, and non-transitory computer-readable medium may include further operations, features, means, or instructions for determining that at least one ACK feedback message, at least one NACK feedback message, or both, were received from the one or more receiving devices, determining that a ratio of ACK feedback messages, NACK messages, or both, to an expected feedback message count fails to satisfy a threshold, and increasing, based on the ratio failing to satisfy the threshold, the contention window size for performing the one or more subsequent transmissions.

Some examples of the method, apparatuses, and non-transitory computer-readable medium described herein may further include operations, features, means, or instructions for applying a weighting factor to each received NACK feedback message to obtain a discounted NACK feedback messages, where determining that the ratio satisfies the threshold may be based on the ACK feedback message and the discounted NACK feedback messages.

In some examples of the method, apparatuses, and non-transitory computer-readable medium described herein, and the method, apparatuses, and non-transitory computer-readable medium may include further operations, features, means, or instructions for determining that at least one ACK feedback message was received from the one or more receiving devices and resetting, based on the at least one ACK feedback message, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining that no ACK feedback messages were received from the one or more receiving devices and increasing, based on no ACK feedback messages, the contention window size for performing the one or more subsequent transmissions.

In some examples of the method, apparatuses, and non-transitory computer-readable medium described herein, and the method, apparatuses, and non-transitory computer-readable medium may include further operations, features, means, or instructions for determining, for one or more transmission types of the mixed transmission types, that at least one ACK feedback message was received from the one or more receiving devices, applying, based on the transmission type of the mixed transmission type, a weighting factor to each ACK feedback message to obtain a weighted ACK metric, and resetting, based on the weighted ACK metric satisfying a threshold, the contention window size for performing the one or more subsequent transmissions.

In some examples of the method, apparatuses, and non-transitory computer-readable medium described herein, each transmission type of the mixed transmission type may be associated with a same weighting factor or with different weighting factors.

In some examples of the method, apparatuses, and non-transitory computer-readable medium described herein, the mixed transmission type include a unicast transmission type, a connection-based groupcast transmission type, a connectionless-based groupcast transmission type, or a combination thereof.

In some examples of the method, apparatuses, and non-transitory computer-readable medium described herein, and the method, apparatuses, and non-transitory computer-readable medium may include further operations, features, means, or instructions for determining that no feedback messages were received from the one or more receiving devices and maintaining, based on the no feedback messages, the contention window size for performing the one or more subsequent transmissions.

In some examples of the method, apparatuses, and non-transitory computer-readable medium described herein, the mixed transmission type include a unicast transmission type, a connection-based groupcast transmission type, a connectionless-based groupcast transmission type, or a combination thereof.

DETAILED DESCRIPTION

Figure 1:
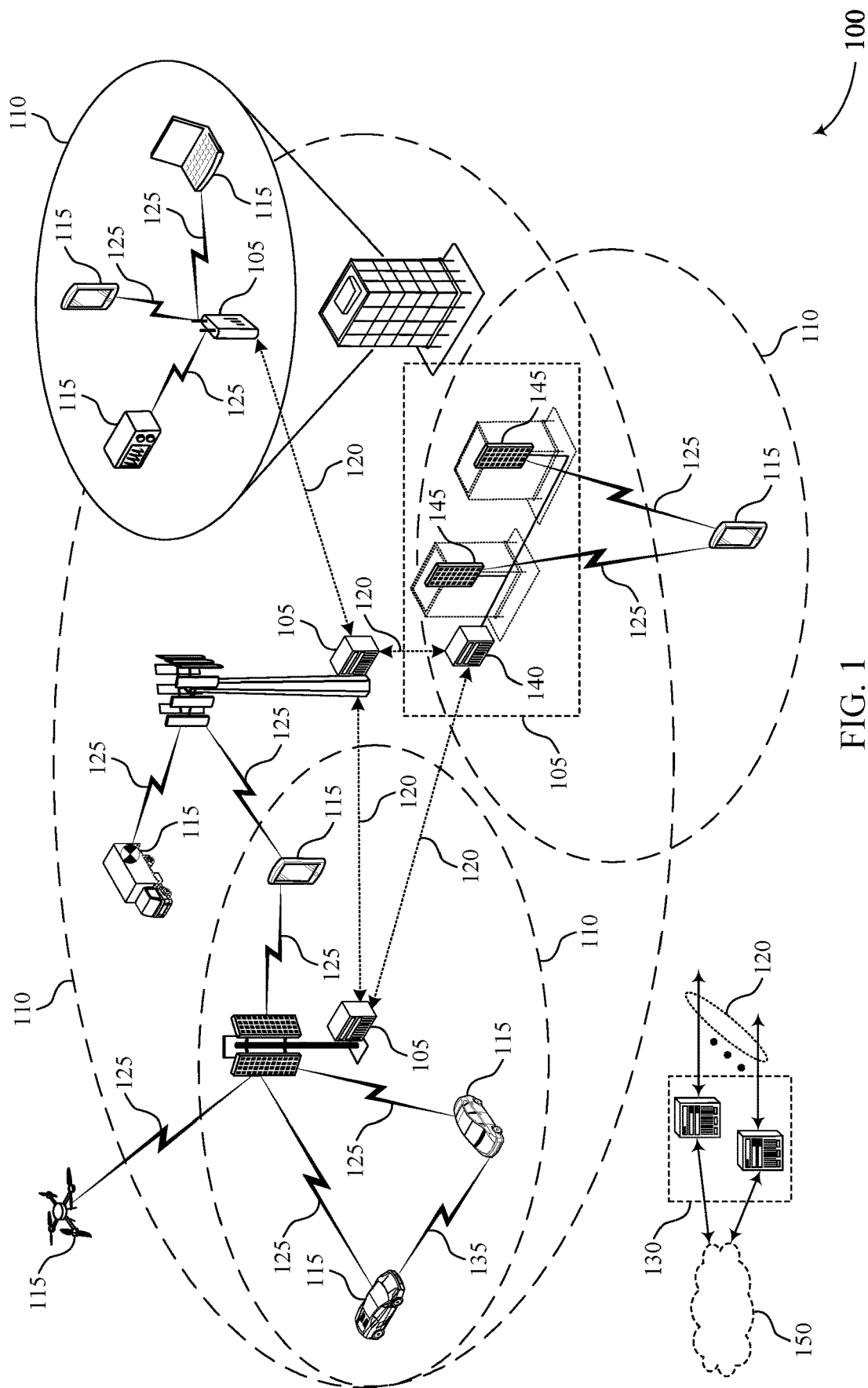
FIG. 1 illustrates an example of a wireless communication system that supports contention window adjustment for new radio unlicensed/sidelink in accordance with aspects of the present disclosure.

Wireless communication systems may use hybrid automatic repeat/request (HARQ) feedback to improve reliability of wireless transmissions. For the Uu interface (e.g., the cellular interface between a base station and user equipment (UE)), rules are generally established that determine how a receiving device constructs and transmits HARQ feedback messages in a manner that the transmitting device can properly interpret and respond to. Some wireless communication systems may use sidelink channels to support inter-UE communications, e.g., vehicle based communications, UE-to-UE communications, etc. The sidelink channel uses a PC5 interface having multiple modes of operation (e.g., different transmission types, such as unicast, broadcast, connection-based groupcast, and connectionless-based groupcast). In some situations, these sidelink transmission types may be associated with unlicensed channels that use a clear channel assessment (CCA) procedure having a contention window (e.g., a backoff window to be applied when the channel is determined busy). However and depending on the transmission type, the transmitting device may not know if there are any receiving devices listening and/or which receiving devices might be available to respond with HARQ feedback signaling. In the CCA context, this may be especially problematic in that the transmitting device may not be able to judge the channel condition based on the presence or absence of acknowledgement/negative-acknowledgement (ACK/NACK, or more simply A/N) feedback. This prevents the transmitting device from adjusting the contention window size in a manner that more accurately responds to the channel conditions.

Aspects of the disclosure are initially described in the context of wireless communication systems. Generally, the described techniques provide various mechanisms that support wireless communications in a wireless network. Broadly, aspects of the described techniques support various mechanisms for HARQ feedback rules to be adopted that are on a transmission-type basis. The rules are specific to particular transmission type(s) and the transmitting device adjusts the contention window size based on the presence/absence and/or content of A/N feedback messages. Accordingly, the transmitting device may perform wireless transmissions using a specific transmission type and/or a mixture of different transmission types and then update its contention window size based on the presence or absence of A/N feedback messages and/or the content of such feedback messages. For example, the transmitting device may reset, maintain, or increase its contention window size based on the HARQ feedback (e.g., the feedback response from receiving device(s)). Accordingly, the transmitting device may be better able to adapt its CCA procedures using contention window sizes based on more accurate channel properties.

Aspects of the disclosure are further illustrated by and described with reference to apparatus diagrams, system diagrams, and flowcharts that relate to contention window adjustment for new radio unlicensed/sidelink.

FIG. 1 illustrates an example of a wireless communication system 100 that supports contention window adjustment for new radio unlicensed/sidelink in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A transmitting device (e.g., a UE 115 and/or a base station 105 performing transmissions to a receiving device) may perform a first transmission to one or more receiving devices, the first transmission associated with a transmission type. The transmitting device may determine a feedback response for the first transmission based on monitoring for feedback messages from the one or more receiving devices in response to the first transmission. The transmitting device may select a contention window size for performing one or more subsequent transmissions based at least in part on the feedback response and the transmission type. The transmitting device may perform the one or more subsequent transmissions in accordance with a clear channel assessment procedure using the selected contention window size.

Figure 2:
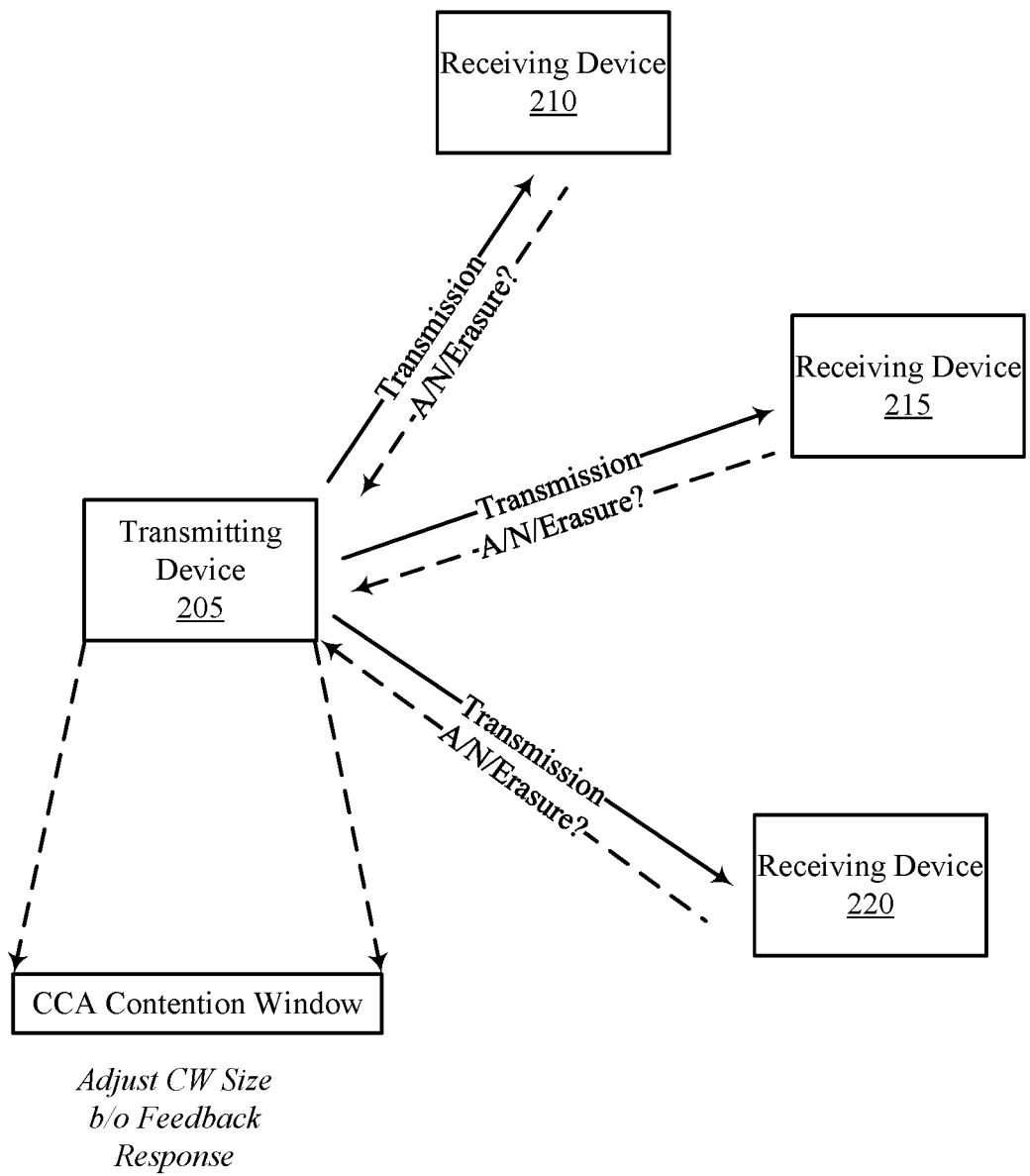
FIG. 2 illustrates an example of a wireless communication system that supports contention window adjustment for new radio unlicensed/sidelink in accordance with aspects of the present disclosure.

FIG. 2 illustrates an example of a wireless communication system 200 that supports contention window adjustment for new radio unlicensed/sidelink in accordance with aspects of the present disclosure. Wireless communication system may implement aspects of wireless communication system 100. Wireless communication system 200 may include transmitting device 205, receiving device 210, receiving device 215, and receiving device 220, with three receiving devices being shown by way of example only. Transmitting device 205 may be an example of a base station and/or a UE, which may be examples of the corresponding devices described herein. Receiving device 210, receiving device 215, and/or receiving device 220 may be examples of a base station and/or UE, which may be examples of the corresponding devices described herein. Accordingly, references to a transmitting device and/or receiving device may refer to a base station and/or UE, depending on the context of the discussion.

Wireless communication system 200 may use sidelink channels to support inter-UE communications, e.g., vehicle based communications, UE-to-UE communications, etc. The sidelink channel uses a PC5 interface having multiple modes of operation (e.g., different transmission types, such as unicast, broadcast, connection-based groupcast, and connectionless-based groupcast). The unicast transmission type may include the transmitting device transmitting to a single receiving device where the transmitting device can specifically request A/N feedback from the receiving device for the transmission. The broadcast transmission type may include the transmitting device transmitting to a group of receiving devices in the neighborhood (e.g., nearby) where the transmitting device does not request A/N feedback from the receiving devices. The connection based groupcast transmission type may include the transmitting device transmitting to a known group of receiving devices where the transmitting device can request A/N feedback from each receiving device. In this transmission type, the receiving devices may use different feedback channel resources (e.g., different physical sidelink feedback channel (PSFCH) resources) to send the A/N feedback.

The connectionless groupcast transmission type may include the transmitting device transmitting to an unknown group of receiving devices (e.g., zone-based) where the transmitting device can request NACK only feedback from the receiving UEs. All receiving devices that receive the transmission may use the same PSFCH resource to send feedback. A receiving device may send NACK if the data portion of the transmission (e.g., the physical sidelink shared channel (PSSCH)) is unable to be successfully received and decoded. All PSFCH feedback (e.g., NACK feedback messages) from all receiving devices may form a system frame number (SFN) transmission at the transmitting device and the transmitting device may retransmit if a single receiving device sends a NACK feedback message.

In some situations, these sidelink transmission types may be associated with unlicensed channels (e.g., NR-U) that use a CCA procedure having a contention window (e.g., a backoff window to be applied when the channel is determined busy). Generally and for the Uu interface, the contention window adjustment for a category-four (CAT-4) listen-before-talk (LBT) (e.g., a full CCA procedure) may be based on the reference slot (e.g., usually the first slot of the channel occupancy time (COT)). If ACK feedback is detected for the transmission (e.g., PDSCH/PUSCH) on the reference slot, the contention window size is reset to a minimum value. If NACK feedback is detected, the transmitting device may increase (e.g., double) the contention window size. These Uu interface-type HARQ techniques are designed for, and therefore only support a unicast transmission type. In the Uu interface, NR-U may be associated with broadcast transmission types, but such transmissions are for system information delivery and there is no A/N feedback enabled. Accordingly, the contention window size is not adjusted based on the broadcast transmission type.

When performing sidelink communications on an unlicensed channel, it may be beneficial to add a corresponding contention window size adjustment procedure as well. In particular, it may be beneficial to provide guidance such that a sidelink transmitting device can properly adjust the contention window size if groupcast or broadcast transmission types are transmitted in the contention window update reference slot. This is because, depending on the transmission type, the transmitting device may not even know if there are any receiving devices listening and/or which receiving devices might be available for A/N feedback. Such techniques may provide guidance so the transmitting device is able to judge the channel condition based on the presence or absence of A/N feedback, and adjust its contention window size accordingly. These techniques may improve behavior of the transmitting and receiving devices, improve HARQ feedback signaling, and minimize unnecessary retransmissions using valuable over-the-air resources.

Accordingly, aspects of the described techniques consider the different transmission types separately (e.g., unicast, connectionless groupcast, connection-based groupcast, and broadcast, although NR-U HARQ procedures may be adopted for broadcast transmission types on the unlicensed sidelink channel). For unicast transmission types, NR-U provides contention window size adjust for unicast transmissions. However, unicast transmissions on the sidelink channel are different than unicast transmissions in NR-U. On the sidelink channel, unicast transmissions include both PSCCH and PSSCH transmissions that are individually encoded and with separate cyclic redundancy check (CRC) protection, but are always transmitted together. Accordingly, aspects of the described HARQ techniques for a unicast transmission type on the sidelink channel are different than the HARQ techniques for a unicast transmission type on the Uu interface channel. Accordingly, aspects of the described techniques address HARQ behavior for each of the different transmission types as well as behavior for a mixture of different transmission types.

Broadly, this may include transmitting device 205 performing a transmission (e.g., a first transmission) to one or more receiving devices (with three receiving devices being shown by way of example only). The transmission may have a corresponding transmission type (e.g., unicast, broadcast, connectionless groupcast, or connection-based groupcast). Accordingly, transmitting device 205, depending on the transmission type, may or may not know if there are any receiving devices available to receive and respond to the transmission. Transmitting device 205 may therefore monitor for feedback message(s) from receiving device(s) (e.g., receiving device 210, receiving device 215, and/or receiving device 220). Transmitting device 205 may monitor the same resource for the feedback message(s) (e.g., a single PSFCH resource) or different resources for the feedback message(s) (e.g., separate PSFCH resources) depending on the transmission type. Based on the monitoring, transmitting device 205 may determine a feedback response (e.g., whether there was ACK feedback, NACK feedback, and/or erasure or absence of A/N feedback from receiving device(s)) for the transmission. Transmitting device 205 may use the feedback response for the transmission and the corresponding transmission type to select a contention window size for subsequent transmissions accordingly. That is, transmitting device 205 may maintain, reduce (e.g., reset), or increase (e.g., double) the contention window size for CCA procedures associated with subsequent transmission(s) based on the feedback response and transmission type. This may provide rules that a transmitting device may use to ensure more accurate contention window size selection for CCA procedures that are based on current channel conditions. This may improve communications on the unlicensed or otherwise shared channel.

Accordingly, aspects of the described techniques provide techniques that transmitting device 205 may follow when performing transmissions of different transmission types on an unlicensed channel. These techniques are on a per-transmission type basis and/or for a mixture of different transmission types. Accordingly, the specific rules to how/ when the contention window size may be updated are based on the transmission type and/or mixture of different transmission types.

Starting first with a connectionless groupcast transmission type (e.g., a connectionless-based groupcast transmission type), a non-exhaustive list of different use cases is first described. In use case 1, there are no other UEs (e.g., receiving devices) close enough to receive the transmission. Therefore, there may be no attempts to send NACK feedback. In use case 2, there are other UEs (e.g., receiving devices) close enough to receive the transmission, but there is a collision and no receiving device can successfully receive and decode PSSCH. Accordingly, none of the receiving devices may send NACK feedback. In use case 3, there are other UEs (e.g., receiving devices) close enough to receive the transmission and all receiving devices are able to successfully receive and decode PSSCH. Accordingly, none of the receiving devices send NACK feedback. In use case 4, there are other UEs (e.g., receiving devices) close enough to receive the transmission, but at least one receiving device failed to successfully receive and decode PSSCH. Accordingly, at least one receiving device may send NACK feedback. In use case 5, there are other UEs (e.g., receiving devices) close enough to receive the transmission, but at least one receiving device failed to successfully receive and decode PSSCH. However, in this use case transmitting device 205 fails to successfully receive and decode the NNACK feedback.

For the connectionless groupcast transmission type, the conditions in which transmitting device 205 performs a connectionless groupcast transmission type are different on a sidelink channel as compared to a Uu interface channel. The described techniques generally provide a different interpretation of the feedback response for contention window size updates for a connectionless groupcast transmission type. For example, a receiving device operating on the sidelink channel typically only transmits A/N when it is able to successfully receive and decode sidelink control information (SCI). That is, a NR-U Uu interface receiving device may transmit NACK even when PDCCH is not detected (e.g., NACK is a filler in the HARQ codebook in PUCCH/PUSCH). However, in a connectionless groupcast transmission type, transmitting device 205 may not know who the receiving device(s) are (e.g., per the use cases discussed above as well as other use cases). That is, transmitting device 205 may not know whether any of receiving device 210, receiving device 215, and/or receiving device 220 are present and available to receive the connectionless groupcast transmission. Accordingly, transmitting device 205 may not know whether or not A/N feedback is to be expected and/or how to interpret erasure (e.g., an absence of A/N feedback). The receiving devices only send NACK on the same resource if the PSSCH decoding fails (e.g., based on the distance from transmitting device 205). That is, all receiving devices may send NACK using the same time/frequency/spatial/code resource, so that the NACK(s) will be in a SFN transmission. Transmitting device 205 may retransmit the packet only if receiving a NACK from at least one receiving device.

Application of the NR-U Uu feedback rules directly to a connectionless groupcast transmission on a NR-U sidelink channel may by problematic. The Uu interface typically interprets NACK as an ACK indication (e.g., confirms that the receiving device was able to at least receive and attempt to decode the transmission). In this situation, transmitting device 205 would (e.g., following the traditional NR-U Uu interface HARQ feedback rules) reset the contention window size if no NACK is received and double the contention window size if NACK feedback is received. This would result in the contention window being reset for use cases 1, 2, 3, and 5, and being doubled for use case 4. However, these scenarios would be inaccurate and may disrupt communications between transmitting device 205 and the receiving device(s). For use case 1, there are no receiving devices around to receive/respond to the transmission, so it would be more beneficial if transmitting device 205 maintained the contention window size (e.g., rather than resetting the contention window size). For use case 2, the transmission failed due to collision, so it would be more beneficial if transmitting device 205 doubled the contention window size (e.g., not reset it). For use case 3, conventional rules to reset the contention window size may be most beneficial (e.g., consistent with NR-U Uu behavior). For use case 4, the receiving device(s) sending NACK feedback must have decoded PSCCH correctly. This situation is different from NR-U Uu rules where sending NACK feedback does not mean the PDCCH is successfully received and decoded as the NACK feedback may be a filler in the HARQ codebook when PDCCH is not detected (e.g., resulting in the transmitting device not doubling the contention window size). For use case 5, this is the same as use case 4 (e.g., consistent with NR-U Uu behavior).

Accordingly and for the connectionless groupcast transmission type, aspects of the described techniques may include transmitting device 205 determining that no feedback messages were received from the receiving device(s) (e.g., one or more of receiving devices 210, 215, and/or 220). Transmitting device 205 may also determine that a second transmission during the reference slot (e.g., the same slot) having a different transmission type was multiplexed with the original transmission during the slot. Based on the absence of A/N feedback messages for the transmission, transmitting device 205 may use A/N feedback messages for the second transmission (e.g., the transmission multiplexed transmission) to select the contention window size. That is, transmitting device 205 may use the A/N feedback response for the other transmission type multiplexed in the reference slot to determine the channel conditions and select a contention window size accordingly.

Continuing with the connectionless groupcast transmission type, transmitting device 205 may determine that there were no other transmission types multiplexed with the transmission during the reference slot (e.g., the same slot). In this situation, transmitting device 205 may maintain the contention window size based on the absence of A/N feedback for the transmission as well as the absence of other transmission types multiplexed during the slot. That is, transmitting device 205 may not interpret an absence of A/N feedback as an indication of the current channel conditions, e.g., the receiving devices in the neighborhood may have passed PSSCH decoding and therefore do not provide a NACK indication.

If transmitting device 205 receives A/N feedback for the connectionless group cast transmission, it may reset the contention window size as the A/N feedback may indicate that the channel conditions are performing within a threshold. This technique may be applicable to use case 4, as well as other use cases.

Accordingly, transmitting device 205 may treat a NACK feedback message (e.g., A/N feedback) as an acknowledgement for PSCCH for connectionless groupcast transmissions (e.g., use the A/N for PSCCH for SCI decoding as the indicator for contention window updates). This may be based on the at least one NACK feedback from at least one receiving device indicating that PSCCH can be decoded, which implies little or not much interference at the PSCCH resources. If transmitting device 205 determines that no feedback messages were received from receiving device(s) associated with the connectionless groupcast transmission (e.g., erasure), it may maintain or reset the contention window size as is (e.g., as no HARQ feedback may indicate that no receiving devices are close enough, which may imply that the channel conditions are acceptable). If transmitting device 205 receives a feedback message indicating ACK for the connectionless groupcast transmission, it may reset the contention window size.

In some aspects, such techniques for the connectionless groupcast transmission type may be based on the particular use case. For example and for use case 1, if transmitting device 205 determines that no feedback messages were received (e.g., erasure) from any receiving device, it may be more beneficial to maintain the contention window size (e.g., unchanged). As another example and for use case 2, if transmitting device 205 determines that no feedback messages were received (e.g., erasure), it may be more beneficial to increase the contention window size (e.g., double the contention window size). As another example for use cases 3 and/or 5, if transmitting device 205 determines that no feedback messages are received (e.g., erasure), it may be more be more beneficial to reset the contention window size.

Turning now to the unicast transmission types in the contention window reference slot, transmitting device 205 may use A/N feedback as indicators for the contention window size updates. For both unicast and connection-based transmission types, the receiving device may transmit A/N feedback via PSFCH when it decodes SCI. That is, ACK feedback may be used to indicate successfully receiving and decoding SCI and NACK feedback may be used to indicate that the PSSCH following that SCI was not successfully decoded. Accordingly, both ACK feedback and NACK feedback may indicate that at least the SCI was successfully transmitted in the reference signal, which may indicate that the channel performance is at least somewhat acceptable. Generally, PSCCH is designed to allow SCI-1 (e.g., SCI typically includes SCI-1 transmitted via PSCCH and SCI-2 transmitted via PSSCH) collisions, and is therefore robust to interference. Accordingly, receiving a NACK feedback may imply that there is little interference in PSCCH and PSSCH symbols.

Accordingly, when there is a unicast transmission in a contention window reference slot, transmitting device 205 may use ACK/NACK feedback as an indicator for contention window size updates. In some examples, this may include transmitting device 205 treating both ACK or NACK for unicast transmission types as acknowledgment for the purposes of contention window size updates, and erasure or an absence of A/N feedback as a negative acknowledgment or non-acknowledgement. For example, transmitting device 205 may determine that at least one feedback message was received from the receiving device(s). Accordingly, transmitting device 205 may reset the contention window size based on the feedback message(s) received from the receiving device(s). If transmitting device 205 determines that no feedback messages have been received from the receiving devices in response to the unicast transmission, transmitting device 205 may increase the contention window size based on the absence of feedback messages.

Accordingly, transmitting device 205 may reset the contention window if A/N feedback is received as SCI has been successfully decoded in the contention window update reference slot. Transmitting device 205 may increase the contention window size if no A/N feedback is received in the known, associated, or otherwise corresponding PSFCH resources. This is because, for a unicast transmission type, transmitting device 205 may know all of the receive UEs and hence PSFCH resources to be used for feedback messages. If no A/N feedback is transmitted by the receiving devices, this may indicate the SCI decoding has failed, which may be associated with interference during the contention window reference slot. In some examples, successful decoding of SCI by the receiving devices may include both SCI-1 and SCI-2. The receiving devices may send A/N feedback only when there is limited interference in the PSCCH region (e.g., for SCI-1) and/or the front part of the PSSCH region that contains SCI-2, and hence SCI-1 and SCI-2 may be decoded.

In some examples, transmitting device 205 may treat only ACK feedback indications for a unicast transmission as acknowledgment, and treat NACK or erasure as a negative acknowledgment. For example, transmitting device 205 may determine that at least one ACK feedback message was received from a receiving device and reset the contention window size based on the acknowledgment message.

Transmitting device 205 may determine that no feedback messages were received or that a NACK feedback message was received from the receiving device. In this situation, transmitting device 205 may increase (e.g., double) the contention window size based on the erasure or NACK indication. This may provide a conservative approach using both PSCCH and PSSCH decoding results as the reference for contention window size updates. Resetting the contention window size if an ACK feedback message is received may be based on the implication that both SCI and PSSCH have been decoded successfully, and therefore there is limited interference in both PSCCH and PSSCH.

Turning now to connection-based groupcast transmission types, a connection-based groupcast transmission may be treated similar to a unicast transmission type, except that the transmitting device 205 may receive A/N feedback from all receiving devices. Aspects of the described techniques use those multiple A/N feedback responses from the receiving devices for contention window size updates.

In one example, this may include transmitting device 205 treating A/N feedback messages as indicators for contention window size updates. For example, in some situations transmitting device 205 may treat an ACK indication as an acknowledgment only or treat A/N indications as acknowledgment for the transmission. For example, transmitting device 205 may determine that at least one ACK feedback message and/or at least one NACK feedback message was received from the receiving device. In this example, transmitting device 205 may reset the contention window size based on the A/N feedback. In another example, transmitting device 205 may determine that at least one ACK feedback message was received and reset the contention window size based on the ACK feedback message.

In some aspects, a weighting factor may be applied to NACK feedback messages received from receiving devices for the connection-based groupcast transmission. That is, NACK feedback indications may be discounted by a given weighting factor. Transmitting device 205 may treat both ACK and NACK feedback indications as acknowledgment, but may discount NACK indications by the weighting factor. Although a NACK indication may imply successful decoding of PSCCH, it also implies that PSSCH was unable to be successfully decoded. Accordingly, the weighting factor may treat a NACK indication as a percentage of an acknowledgement indication (e.g., NACK=weighting factor multiplied by an ACK indication, such as NACK is treated as 0.1 ACK indications for the purposes of contention window size updates). Accordingly, transmitting device 205 may apply the weighting factor to NACK feedback messages received from the receiving devices and reset the contention window size based on the weighting factor. For example, if the percentage or total number of ACK indications (which includes all ACK indications and the weighted/discounted NACK indications) reaches a threshold, transmitting device 205 may reset the contention window size. If the total number of ACK indications fail to reach the threshold, transmitting device 205 may maintain or increase the contention window size.

In some situations, transmitting device 205 may, for a connection-based groupcast transmission type, update the contention window size based on receiving multiple A/N feedback messages. In one example, this may include transmitting device 205 resetting the contention window size if the percentage of ACK feedback messages is greater than a threshold, otherwise transmitting device 205 may increase (e.g., double) the contention window size. That is, transmitting device 205 may determine that at least one ACK and/or NACK feedback message were received from the receiving device. Transmitting device 205 may determine the ratio of ACK and/or NACK feedback messages with respect to an expected feedback message count (e.g., based on the number of feedback messages that transmitting device 205 is expecting to receive on PSFCH resource(s)). Transmitting device 205 may increase the contention window size if the ratio fails to satisfy a threshold and maintain or reset the contention window size if the ratio satisfies a threshold.

Accordingly, in this example transmitting device 205 may know the number of receiving devices expected to receive the connection-based groupcast transmission, and therefore may know the total number of expected feedback messages to be received. If the preconfigured percentage (e.g., the ratio) of receiving devices are able to successfully receive and decode PSCCH/PSSCH, this may provide an indication that the channel is clear and therefore the contention window size can be reset or maintained as is.

In some aspects, this may include a transmitting device 205 applying the weighting factor for each NACK feedback message indication to obtain a discounted NACK feedback message. Again, the ratio of ACK feedback messages and discounted NACK feedback messages to the expected feedback message count may be used for contention window size updates.

In some situations and continuing with the connection-based groupcast transmission type discussion, transmitting device 205 may reset the contention window size if at least one of the feedback messages received from receiving devices in response to the connection-based groupcast transmission is an ACK feedback indication. Otherwise, transmitting device 205 may increase (e.g., double) the contention window size. That is, transmitting device 205 may determine that at least one ACK feedback message has been received from the receiving devices and, in response, reset the contention window size. If transmitting device 205 determines that no ACK feedback messages were received from the receiving devices, transmitting device 205 may increase the contention window size.

Accordingly, transmitting device 205 may focus on whether there is interference near itself (e.g., due to a hidden node problem). If there is no interference nearby, transmitting device 205 may determine that there is at least one receiving device that can successfully decode SCI/PSSCH and transmit the ACK indication.

As discussed above and in the broadcast transmission type scenario, transmitting device 205 may refrain from performing contention window size updates based on broadcast transmissions. That is, broadcast transmissions may not support A/N feedback message signaling, and therefore contention window size adjustments based on the transmitting device 205 performing a transmission having a broadcast transmission type may be avoided.

In some situations, there may be a mixture of transmission types being transmitted during the contention window update reference slot. For example, transmitting device 205 may perform a mixed transmission during the reference slot that includes a mixture of a unicast transmission, connection-based groupcast transmission, connection less groupcast transmissions, and the like. In this situation, transmitting device 205 may consider the mixture of transmission types during the contention window reference slot when making contention window size updates.

In one example of the mixed transmission type scenario, this may include the mixed transmission types being multiplexed in the same reference slot. Transmitting device 205 may combine ACK feedback message indications for contention window size updates. In some aspects, this may include application of the weighting factor to each ACK feedback message. For example, transmitting device 205 may determine that at least one ACK feedback message was received from receiving devices for one or more transmission types of the mixture of transmission types. Transmitting device 205 may apply the weighting factor to each ACK feedback message to identify or otherwise obtain a weighted ACK metric. Transmitting device 205 may reset the contention window size when the weighted ACK metric satisfies a threshold or maintain/increase the contention window size when the weighted ACK metric fails to satisfy a threshold. In some examples, the different transmission types of the mixed transmission type may be associated with the same weighting factor or with different weighting factors.

For example, transmitting device 205 may define the percentage of ACK feedback messages for a mix of transmission types (e.g., may define the threshold) as $P_{acknowledge} = (\alpha_{unicast} \times P_{unicast} + \alpha_{CB} \times P_{CB} + \alpha_{CL} \times P_{CL}) \div (\alpha_{unicast} + \alpha_{CB} + \alpha_{CL})$. $P_{unicast}$ may refer to the percentage of ACK feedback messages received over multiple unicast transmissions. $P_{CB}$ may refer to the percentage of ACK feedback messages received over multiple PSFCH resources pairs for the group of receiving devices and possible multiple groupcast packets. In some situations, $P_{CB}$ may be set to "1" if receiving an ACK feedback message from at least one receiving device. $P_{CL}$ may refer to the percentage of ACK feedback messages received over multiple connection-less groupcast transmissions. $\alpha_{unicast}$, $\alpha_{CB}$, and $\alpha_{CL}$ may refer to positive weighting factors configured for each transmission type in the mixed transmission type scenario, which may be the same or may be different for each transmission type. For example, for a mixture of unicast, connection-based groupcast, and connectionless groupcast transmission types, $\alpha_{CL}$ may be set to "0" as connectionless groupcast feedback may not provide as much information regarding contention window size updates as compared to unicast and connection-based groupcast transmission types. If $P_{acknowledge}$ is greater than a threshold, then transmitting device 205 may reset the contention window size. If not, transmitting device 205 may increase (e.g., double) the contention window size.

In some mixed transmission type situations, there may be no receiving devices nearby to receive the transmissions from transmitting device 205. In that situation, treating erasure (e.g., an absence of feedback messages) as non-acknowledgement, and therefore increasing the contention window size, may be undesirable. Instead, maintaining the contention window size may be more appropriate in this situation. Accordingly, in some situations transmitting device 205 may determine that no feedback messages were received and, therefore, maintain the contention window size. In some aspects, this may include a determination that no feedback messages were received during a time period, e.g., for a threshold number of slots. Accordingly, transmitting device 205 may determine that no feedback messages were received during the time period and maintain the contention window size. This may address the situation where a lack of feedback messages indicates that there are no receiving devices nearby, or that such receiving devices are blocked by an interfering transmission, rather than indicting that the channel performance is poor.

Figure 3:
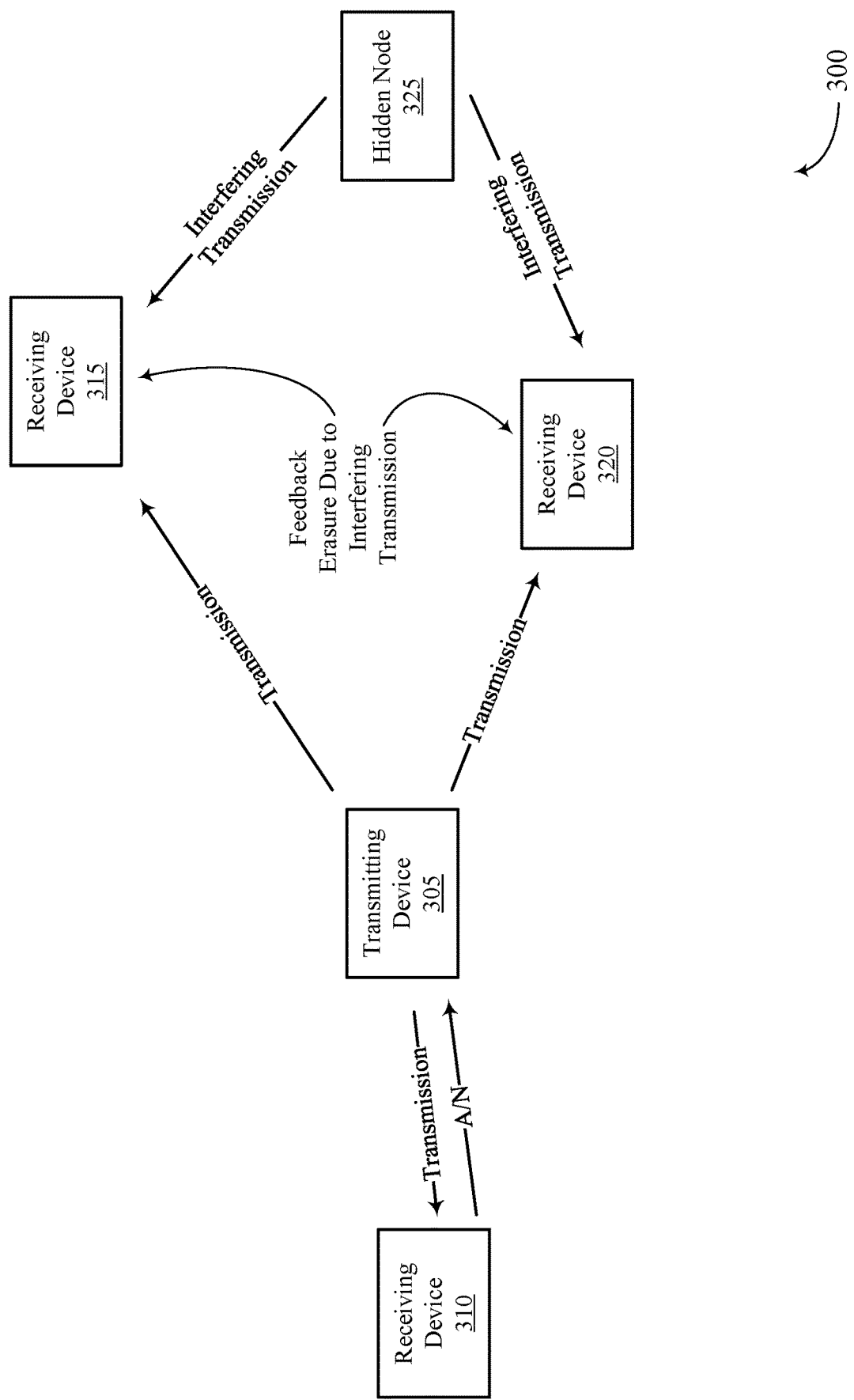
FIG. 3 illustrates an example of a wireless communication system that supports contention window adjustment for new radio unlicensed/sidelink in accordance with aspects of the present disclosure.

FIG. 3 illustrates an example of a wireless communication system 300 that supports contention window adjustment for new radio unlicensed/sidelink in accordance with aspects of the present disclosure. Wireless communication system 300 may implement aspects of wireless communication systems 100 and/or 200. Wireless communication system 300 may include transmitting device 305, receiving device 310, receiving device 315, receiving device 320, and hidden node 325, which may be examples of the corresponding devices described herein.

As discussed above, the described techniques provide various techniques that may be adopted for contention window size updates based on the specific transmission type(s) being performed by transmitting device 305. For example, transmitting device 305 may perform a transmission (e.g., a first transmission) to one or more receiving devices, with three receiving devices shown by way of example only. This may include transmitting device 305 performing a wireless transmission to receiving device 310, receiving device 315, and/or receiving device 320. The transmission may be or have an associated transmission type (e.g., unicast transmission type, connection-based groupcast transmission type, and/or connectionless groupcast transmission type). Transmitting device 305 may monitor for feedback messages from the receiving device(s) to determine the feedback response for the transmission. That is, transmitting device 305 may determine whether ACK feedback messages, NACK feedback messages, or erasure (e.g., no feedback messages) for the transmission.

Based on the feedback response, transmitting device 305 may select a contention window size for subsequent transmissions. For example, transmitting device 305 may maintain the contention window size as is, may increase the contention window size (e.g., double), or may reset the contention window size (e.g., to a default size) based on the feedback response and the transmission type.

One solution discussed above may include transmitting device 305, for connection-based groupcast transmissions, updating the contention window based on multiple A/N feedback messages. For example, transmitting device 305 may reset the contention window size if the percentage (e.g., ratio) of acknowledgement messages (ACK or NACK feedback messages) with respect to an expected number of feedback messages satisfies a threshold. As the number of receiving devices in a connection-based groupcast transmission scenario may be known by transmitting device 305, updating the contention window size based on the ratio satisfying the threshold may be based on the assumption that the channel is clean.

However, wireless communication system 300 illustrates an example where transmitting device 305 may be better suited to reset the contention window size based on receiving at least one feedback message from a receiving device. For example, wireless communication system 300 illustrates an example where receiving device 315 and receiving device 320 may be known receiving devices for the connection-based groupcast transmission, and therefore expected to transmit feedback messages in response to the transmission. However, hidden node 325 may be an unknown node to transmitting device 305 and may be performing its own transmission that interferes with reception of the connection-based groupcast transmission by receiving device 315 and receiving device 320. As receiving device 315 and receiving device 320 are unable to receive the transmission from transmitting device 305, they may not transmit feedback messages (e.g., erasure).

In this situation, it may be more appropriate for transmitting device 305 to reset the contention window size of at least one ACK feedback message is received from any of the receiving devices, such as from receiving device 310. Accordingly, transmitting device 305 may reset the contention window size if at least one ACK feedback message is received or increase the contention window size if no ACK feedback messages are received.

Figure 4:
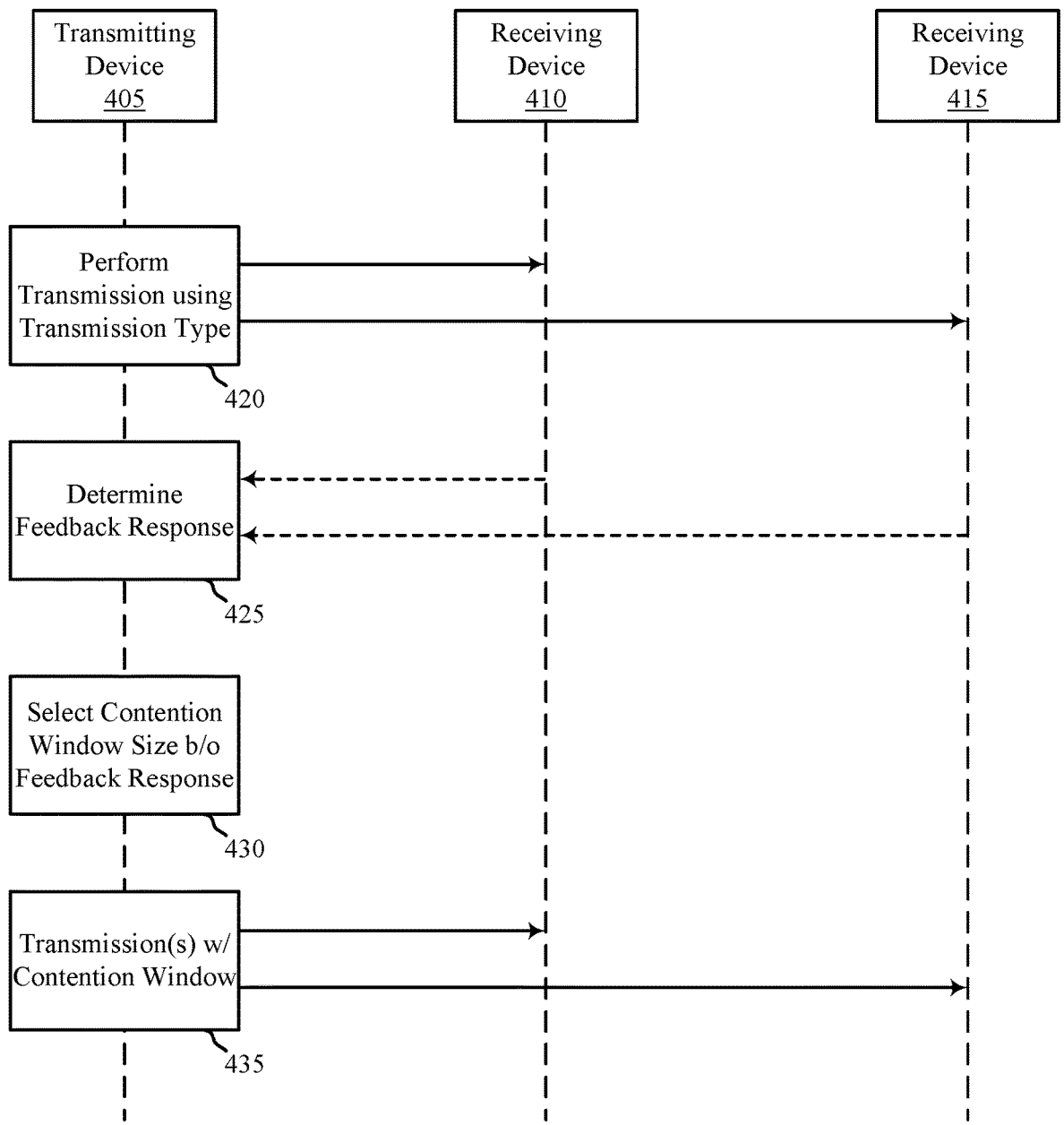
FIG. 4 illustrates an example of a process that supports contention window adjustment for new radio unlicensed/sidelink in accordance with aspects of the present disclosure.

FIG. 4 illustrates an example of a process 400 that supports contention window adjustment for new radio unlicensed/sidelink in accordance with aspects of the present disclosure. Process 400 may implement aspects of wireless communication systems 100, 200, and/or 300. Aspects of process 400 may be implemented by or implemented at transmitting device 405, receiving device 410, and/or receiving device 4115, which may be examples of the corresponding devices described herein.

At 420, transmitting device 405 may transmit or otherwise provide a transmission (e.g., a first transmission) to one or more receiving devices, such as receiving device 410 and receiving device 415. The transmission may be of or associated with a transmission type, such as a unicast transmission type, a connection-based groupcast transmission type, a connectionless transmission type, and the like. The transmission may be performed using sidelink channel(s) in some examples.

At 425, transmitting device 405 may determine a feedback response for the transmission based on monitoring for feedback messages from receiving device 410 and/or receiving device 415. In some examples (e.g., depending on the transmission type), transmitting device 405 may know which receiving devices are expected to transmit a feedback message. In other examples, transmitting device 405 may not know which receiving devices are expected to transmit a feedback message. For example, some transmission types are associated with know and shared PSFCH resources, which transmitting device 405 may monitor for feedback messages. Generally, the feedback response may be based on the presence or absence of feedback messages and/or based on the content of the feedback messages (e.g., ACK or NACK feedback messages). In some situations, transmitting device 405 may apply a weighting factor to NACK feedback messages (e.g., to derive a discounted NACK feedback message). For example, transmitting device 405 may use the discounted NACK feedback message(s) (alone or in combination with ACK feedback messages) to determine the feedback response, and the resulting contention window size updates.

At 430, transmitting device 405 may select a contention window size for subsequent transmissions based on the feedback response and transmission type. For example, transmitting device may increase (e.g., double) the contention window size, may reset the contention window size (e.g., to a default value), or may maintain the contention window size as is based on the feedback response and transmission type. Accordingly, transmitting device 405 may use the feedback response for specific transmission types to estimate channel performance, and update the contention window size for future CCA procedures to more accurately mitigate channel conditions.

At 435, transmitting device 405 may perform such subsequent transmissions to receiving device 410 and/or receiving device 415 based on the selected or updated contention window size. This may improve sidelink communications via unlicensed channels accounting for different transmission types used for such sidelink communications.

Figure 5:
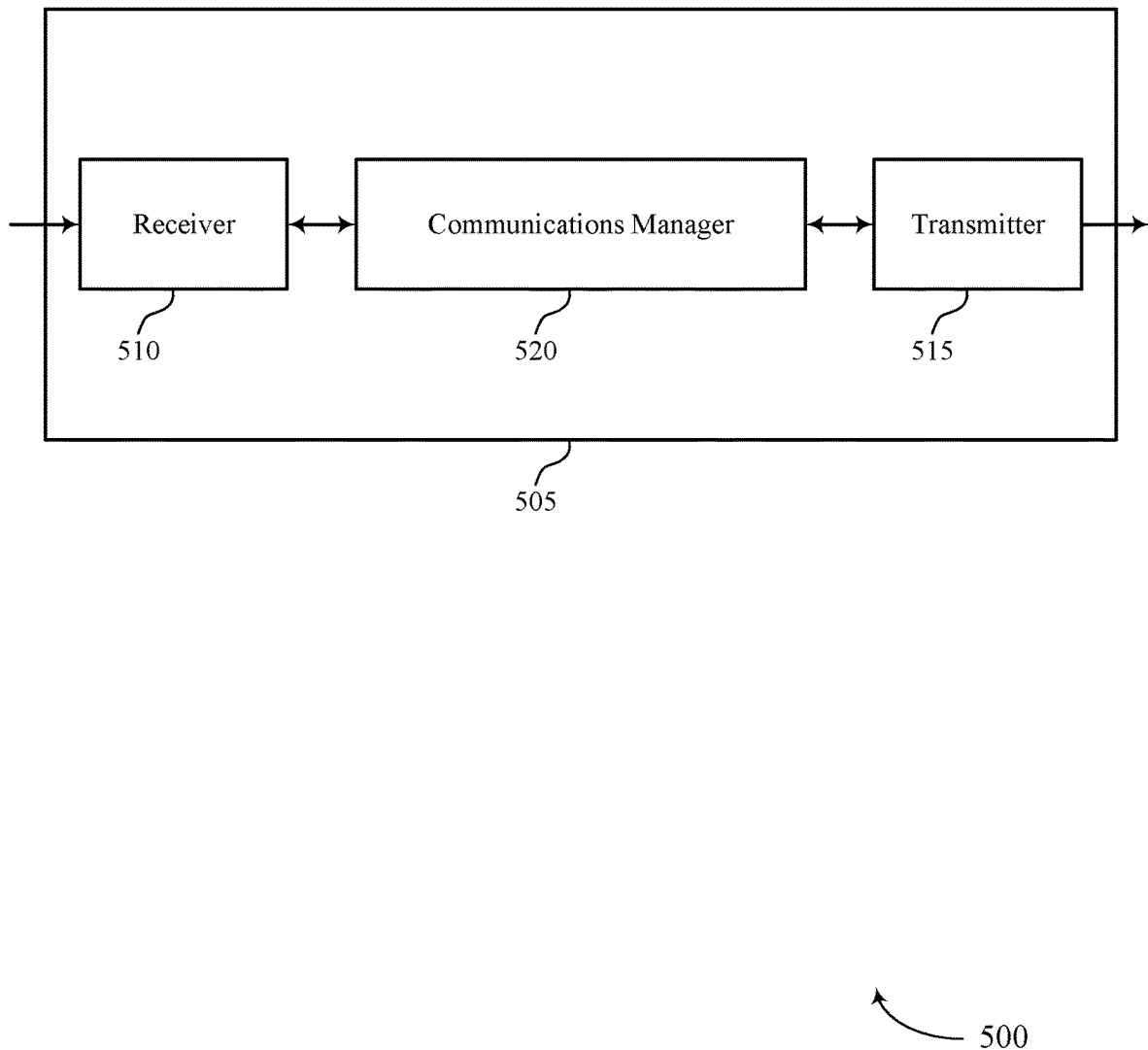
FIGS. 5 and 6 show block diagrams of devices that support contention window adjustment for new radio unlicensed/sidelink in accordance with aspects of the present disclosure.

FIG. 5 shows a block diagram 500 of a device 505 that supports contention window adjustment for new radio unlicensed/sidelink in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to contention window adjustment for new radio unlicensed/sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to contention window adjustment for new radio unlicensed/sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of contention window adjustment for new radio unlicensed/sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a transmitting device in accordance with examples as disclosed herein. For example, the communications manager 520 may be configured as or otherwise support a means for performing a first transmission to one or more receiving devices, the first transmission associated with a transmission type. The communications manager 520 may be configured as or otherwise support a means for determining a feedback response for the first transmission based on monitoring for feedback messages from the one or more receiving devices in response to the first transmission. The communications manager 520 may be configured as or otherwise support a means for selecting a contention window size for performing one or more subsequent transmissions based on the feedback response and the transmission type. The communications manager 520 may be configured as or otherwise support a means for performing the one or more subsequent transmissions in accordance with a clear channel assessment procedure using the selected contention window size.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving contention window size updates for CCA procedures performed on a sidelink channel based on the feedback response for a transmission and the corresponding transmission type of that transmission.

Figure 6:
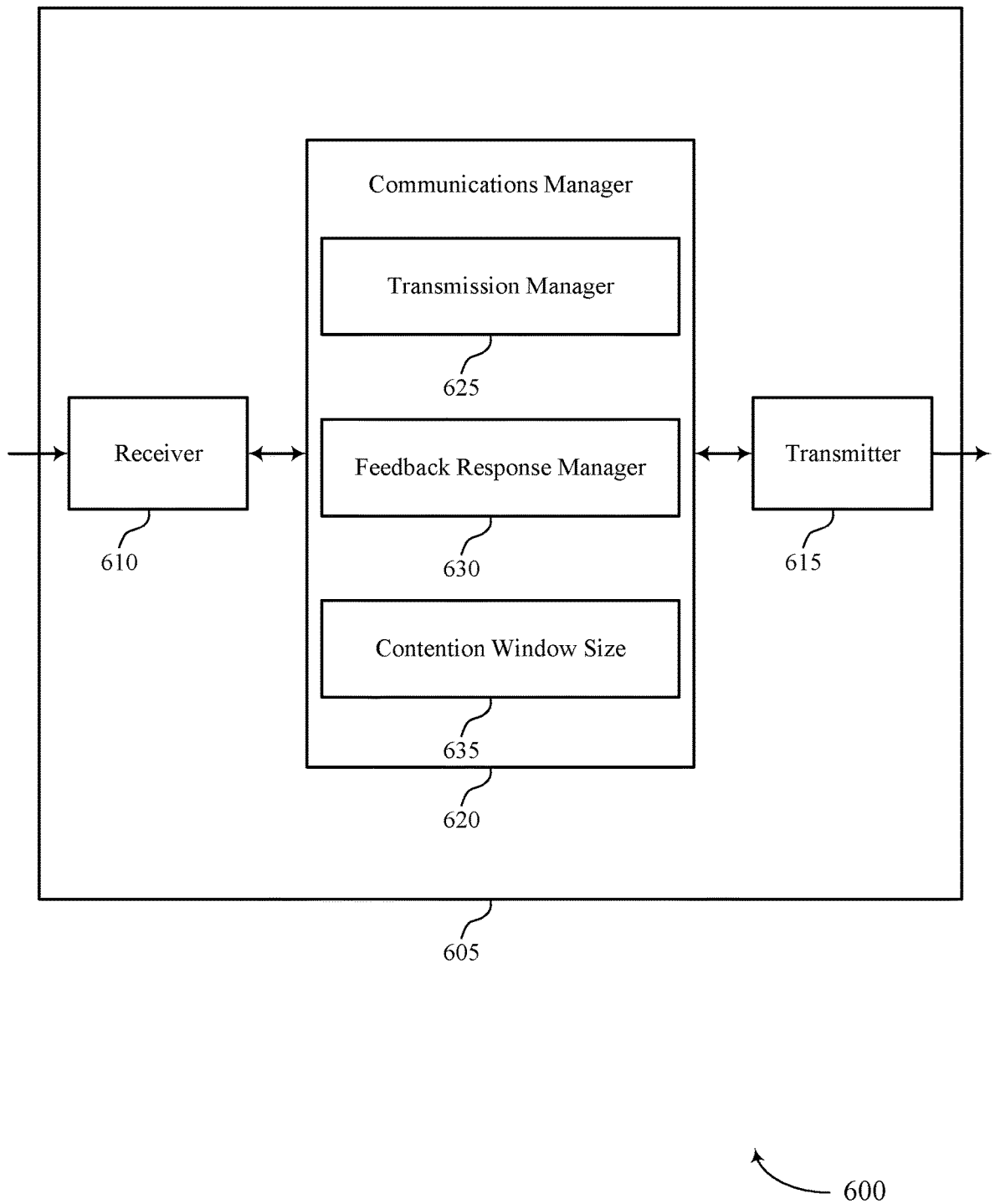

FIG. 6 shows a block diagram 600 of a device 605 that supports contention window adjustment for new radio unlicensed/sidelink in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to contention window adjustment for new radio unlicensed/sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to contention window adjustment for new radio unlicensed/sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of contention window adjustment for new radio unlicensed/sidelink as described herein. For example, the communications manager 620 may include a transmission manager 625, a feedback response manager 630, a contention window size 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a transmitting device in accordance with examples as disclosed herein. The transmission manager 625 may be configured as or otherwise support a means for performing a first transmission to one or more receiving devices, the first transmission associated with a transmission type. The feedback response manager 630 may be configured as or otherwise support a means for determining a feedback response for the first transmission based on monitoring for feedback messages from the one or more receiving devices in response to the first transmission. The contention window size 635 may be configured as or otherwise support a means for selecting a contention window size for performing one or more subsequent transmissions based on the feedback response and the transmission type. The transmission manager 625 may be configured as or otherwise support a means for performing the one or more subsequent transmissions in accordance with a clear channel assessment procedure using the selected contention window size.

Figure 7:
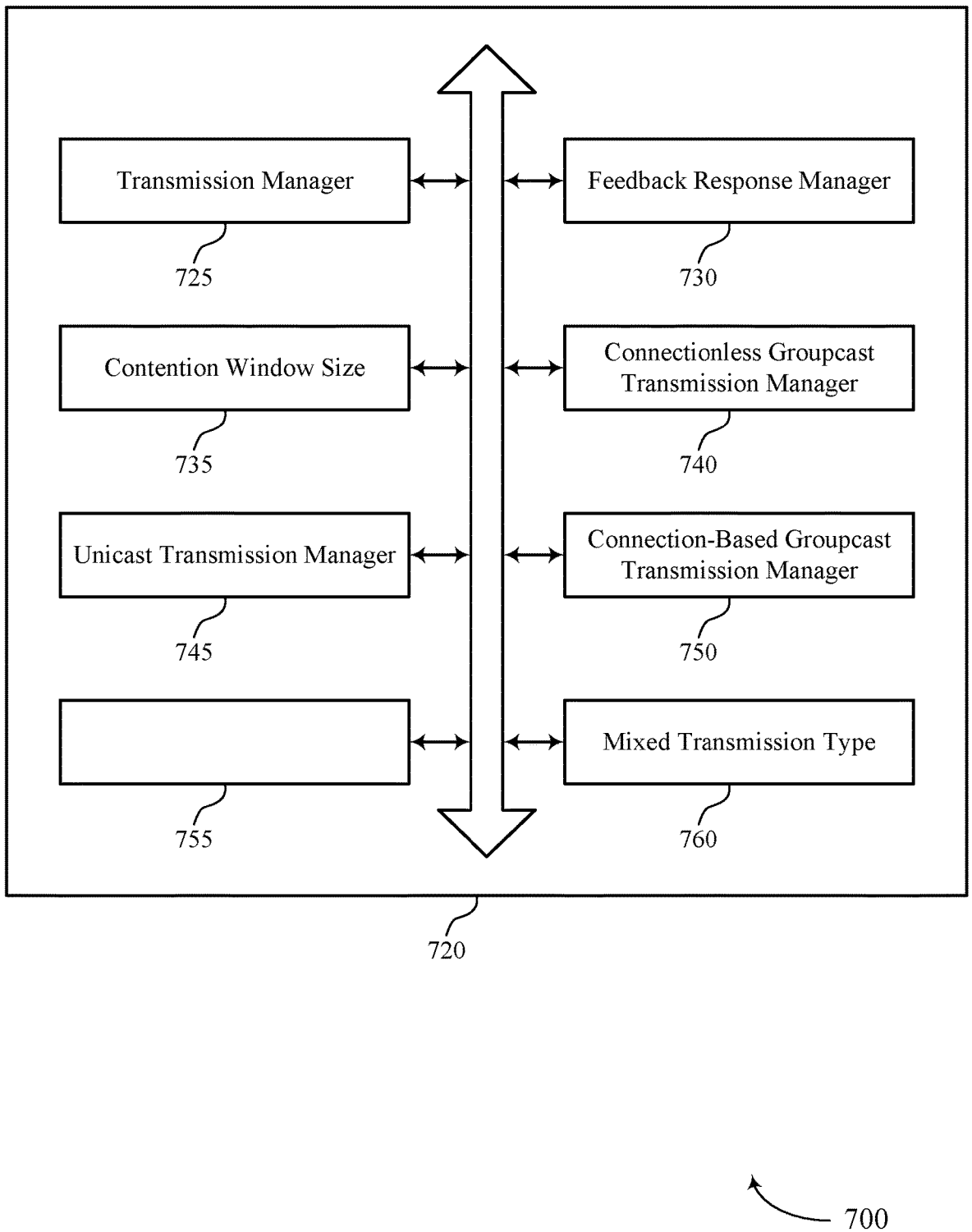
FIG. 7 shows a block diagram of a communications manager that supports contention window adjustment for new radio unlicensed/sidelink in accordance with aspects of the present disclosure.

FIG. 7 shows a block diagram 700 of a communications manager 720 that supports contention window adjustment for new radio unlicensed/sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of contention window adjustment for new radio unlicensed/sidelink as described herein. For example, the communications manager 720 may include a transmission manager 725, a feedback response manager 730, a contention window size 735, a connectionless groupcast transmission manager 740, a unicast transmission manager 745, a connection-based groupcast transmission manager 750, a mixed transmission type 760, or any combination thereof. Each of these components may communicate, directly or indirectly, with one another (e.g., via one or more buses).

The communications manager 720 may support wireless communication at a transmitting device in accordance with examples as disclosed herein. The transmission manager 725 may be configured as or otherwise support a means for performing a first transmission to one or more receiving devices, the first transmission associated with a transmission type. The feedback response manager 730 may be configured as or otherwise support a means for determining a feedback response for the first transmission based on monitoring for feedback messages from the one or more receiving devices in response to the first transmission. The contention window size 735 may be configured as or otherwise support a means for selecting a contention window size for performing one or more subsequent transmissions based on the feedback response and the transmission type. In some examples, the transmission manager 725 may be configured as or otherwise support a means for performing the one or more subsequent transmissions in accordance with a clear channel assessment procedure using the selected contention window size.

In some examples, the connectionless groupcast transmission manager 740 may be configured as or otherwise support a means for determining that no feedback messages were received from the one or more receiving devices for the first transmission. In some examples, the connectionless groupcast transmission manager 740 may be configured as or otherwise support a means for determining that a second transmission type was multiplexed with the first transmission during a same slot, the second transmission associated with a different transmission type. In some examples, the connectionless groupcast transmission manager 740 may be configured as or otherwise support a means for selecting, based on receiving at least one feedback message for the second transmission, the contention window size for performing the one or more subsequent transmissions. In some examples, the connectionless groupcast transmission manager 740 may be configured as or otherwise support a means for determining that at least one NACK feedback message was received from the one or more receiving devices. In some examples, the connectionless groupcast transmission manager 740 may be configured as or otherwise support a means for resetting, based at least in part on the at least one negative-acknowledgement feedback message, the contention window size for e performing the one or more subsequent transmissions.

In some examples, the connectionless groupcast transmission manager 740 may be configured as or otherwise support a means for determining that no feedback messages were received from the one or more receiving devices. In some examples, the connectionless groupcast transmission manager 740 may be configured as or otherwise support a means for determining that no second transmission types were multiplexed with the first transmission during a same slot. In some examples, the connectionless groupcast transmission manager 740 may be configured as or otherwise support a means for maintaining, based on no feedback messages and no second transmission types being multiplexed with the first transmission during the same slot, the contention window size for performing the one or more subsequent transmissions.

In some examples, the unicast transmission manager 745 may be configured as or otherwise support a means for determining that at least one feedback message was received. In some examples, the unicast transmission manager 745 may be configured as or otherwise support a means for resetting, based on the at least one feedback message, the contention window size for performing the one or more subsequent transmissions.

In some examples, the at least one feedback message includes at least one negative-acknowledgement feedback message, at least one acknowledgement feedback message, or both.

In some examples, the unicast transmission manager 745 may be configured as or otherwise support a means for determining that no feedback messages were received. In some examples, the unicast transmission manager 745 may be configured as or otherwise support a means for increasing, based on the no feedback messages, the contention window size for performing the one or more subsequent transmissions.

In some examples, the unicast transmission manager 745 may be configured as or otherwise support a means for determining that at least one acknowledgement feedback message was received. In some examples, the unicast transmission manager 745 may be configured as or otherwise support a means for resetting, based on the at least one acknowledgement feedback message, the contention window size for performing the one or more subsequent transmissions.

In some examples, the unicast transmission manager 745 may be configured as or otherwise support a means for determining that no feedback messages were received or that a negative-acknowledgement feedback message was received. In some examples, the unicast transmission manager 745 may be configured as or otherwise support a means for increasing, based on the no feedback messages or the negative-acknowledgement feedback message, the contention window size for performing the one or more subsequent transmissions.

In some examples, the connection-based groupcast transmission manager 750 may be configured as or otherwise support a means for determining that at least one acknowledgement feedback message, at least one negative-acknowledgement feedback message, or both, were received from the one or more receiving devices. In some examples, the connection-based groupcast transmission manager 750 may be configured as or otherwise support a means for resetting, based on the at least one acknowledgement feedback message, the at least one negative-acknowledgement feedback message, or both, the contention window size for performing the one or more subsequent transmissions.

In some examples, the connection-based groupcast transmission manager 750 may be configured as or otherwise support a means for applying a weighting factor to one or more negative-acknowledgement feedback messages received from the one or more receiving devices, where resetting the contention window size for performing the one or more subsequent transmissions based on the weighting factor.

In some examples, the connection-based groupcast transmission manager 750 may be configured as or otherwise support a means for applying a weighting factor to each received negative-acknowledgement feedback message to obtain a discounted negative-acknowledgement feedback messages, where determining that the ratio satisfies the threshold is based on the acknowledgement feedback message and the discounted negative-acknowledgement feedback messages.

In some examples, the connection-based groupcast transmission manager 750 may be configured as or otherwise support a means for determining that at least one acknowledgement feedback message, at least one negative-acknowledgement feedback message, or both, were received from the one or more receiving devices. In some examples, the connection-based groupcast transmission manager 750 may be configured as or otherwise support a means for determining that a ratio of acknowledgement feedback messages, negative-acknowledgement messages, or both, to an expected feedback message count satisfies a threshold. In some examples, the connection-based groupcast transmission manager 750 may be configured as or otherwise support a means for resetting, based on the ratio satisfying the threshold, the contention window size for performing the one or more subsequent transmissions.

In some examples, the connection-based groupcast transmission manager 750 may be configured as or otherwise support a means for determining that at least one acknowledgement feedback message, at least one negative-acknowledgement feedback message, or both, were received from the one or more receiving devices. In some examples, the connection-based groupcast transmission manager 750 may be configured as or otherwise support a means for determining that a ratio of acknowledgement feedback messages, negative-acknowledgement messages, or both, to an expected feedback message count fails to satisfy a threshold. In some examples, the connection-based groupcast transmission manager 750 may be configured as or otherwise support a means for increasing, based on the ratio failing to satisfy the threshold, the contention window size for performing the one or more subsequent transmissions.

In some examples, the connection-based groupcast transmission manager 750 may be configured as or otherwise support a means for applying a weighting factor to each received negative-acknowledgement feedback message to obtain a discounted negative-acknowledgement feedback messages, where determining that the ratio satisfies the threshold is based on the acknowledgement feedback message and the discounted negative-acknowledgement feedback messages.

In some examples, the connection-based groupcast transmission manager 750 may be configured as or otherwise support a means for determining that at least one acknowledgement feedback message was received from the one or more receiving devices. In some examples, the connection-based groupcast transmission manager 750 may be configured as or otherwise support a means for resetting, based on the at least one acknowledgement feedback message, the contention window size for performing the one or more subsequent transmissions.

In some examples, the connection-based groupcast transmission manager 750 may be configured as or otherwise support a means for determining that no acknowledgement feedback messages were received from the one or more receiving devices. In some examples, the 755 may be configured as or otherwise support a means for increasing, based on no acknowledgement feedback messages, the contention window size for performing the one or more subsequent transmissions.

In some examples, the mixed transmission type 760 may be configured as or otherwise support a means for determining, for one or more transmission types of the mixed transmission types, that at least one acknowledgement feedback message was received from the one or more receiving devices. In some examples, the mixed transmission type 760 may be configured as or otherwise support a means for applying, based on the transmission type of the mixed transmission type, a weighting factor to each acknowledgement feedback message to obtain a weighted acknowledgement metric. In some examples, the mixed transmission type 760 may be configured as or otherwise support a means for resetting, based on the weighted acknowledgement metric satisfying a threshold, the contention window size for performing the one or more subsequent transmissions.

In some examples, each transmission type of the mixed transmission type is associated with a same weighting factor or with different weighting factors.

In some examples, the mixed transmission type include a unicast transmission type, a connection-based groupcast transmission type, a connectionless-based groupcast transmission type, or a combination thereof.

In some examples, the mixed transmission type 760 may be configured as or otherwise support a means for determining that no feedback messages were received from the one or more receiving devices. In some examples, the mixed transmission type 760 may be configured as or otherwise support a means for maintaining, based on the no feedback messages, the contention window size for performing the one or more subsequent transmissions.

In some examples, the mixed transmission type include a unicast transmission type, a connection-based groupcast transmission type, a connectionless-based groupcast transmission type, or a combination thereof.

Figure 8:
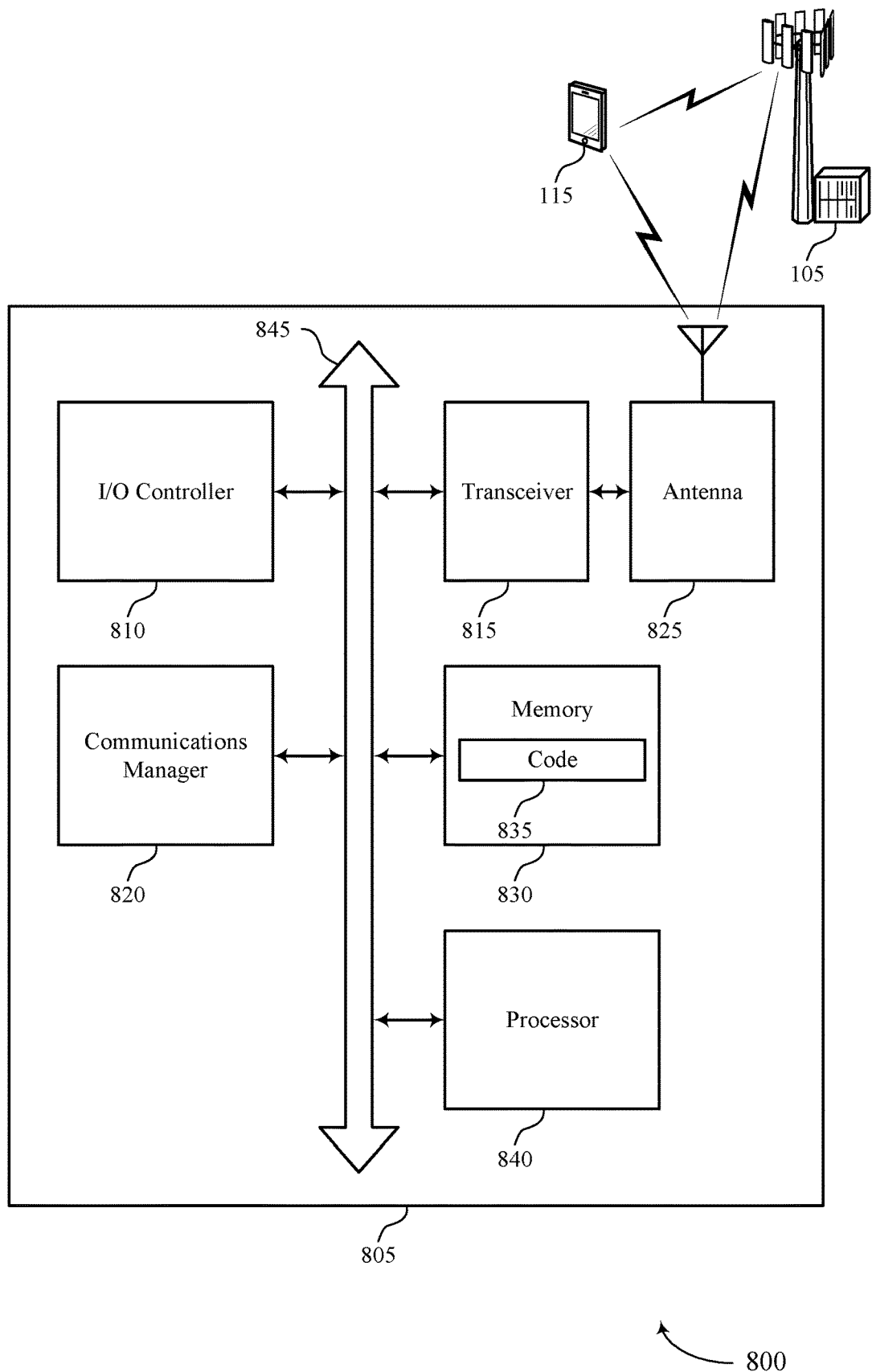
FIG. 8 shows a diagram of a system including a UE that supports contention window adjustment for new radio unlicensed/sidelink in accordance with aspects of the present disclosure.

FIG. 8 shows a diagram of a system 800 including a device 805 that supports contention window adjustment for new radio unlicensed/sidelink in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting contention window adjustment for new radio unlicensed/sidelink). For example, the device 805 or a component of the device 805 may include a processor 840 and memory 830 coupled to the processor 840, the processor 840 and memory 830 configured to perform various functions described herein.

The communications manager 820 may support wireless communication at a transmitting device in accordance with examples as disclosed herein. For example, the communications manager 820 may be configured as or otherwise support a means for performing a first transmission to one or more receiving devices, the first transmission associated with a transmission type. The communications manager 820 may be configured as or otherwise support a means for determining a feedback response for the first transmission based on monitoring for feedback messages from the one or more receiving devices in response to the first transmission. The communications manager 820 may be configured as or otherwise support a means for selecting a contention window size for performing one or more subsequent transmissions based on the feedback response and the transmission type. The communications manager 820 may be configured as or otherwise support a means for performing the one or more subsequent transmissions in accordance with a clear channel assessment procedure using the selected contention window size.

By including or configuring the communications manager 820 in accordance with examples as described herein, the device 805 may support techniques for improving contention window size updates for CCA procedures performed on a sidelink channel based on the feedback response for a transmission and the corresponding transmission type of that transmission.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of contention window adjustment for new radio unlicensed/sidelink as described herein, or the processor 840 and the memory 830 may be otherwise configured to perform or support such operations.

Figure 9:
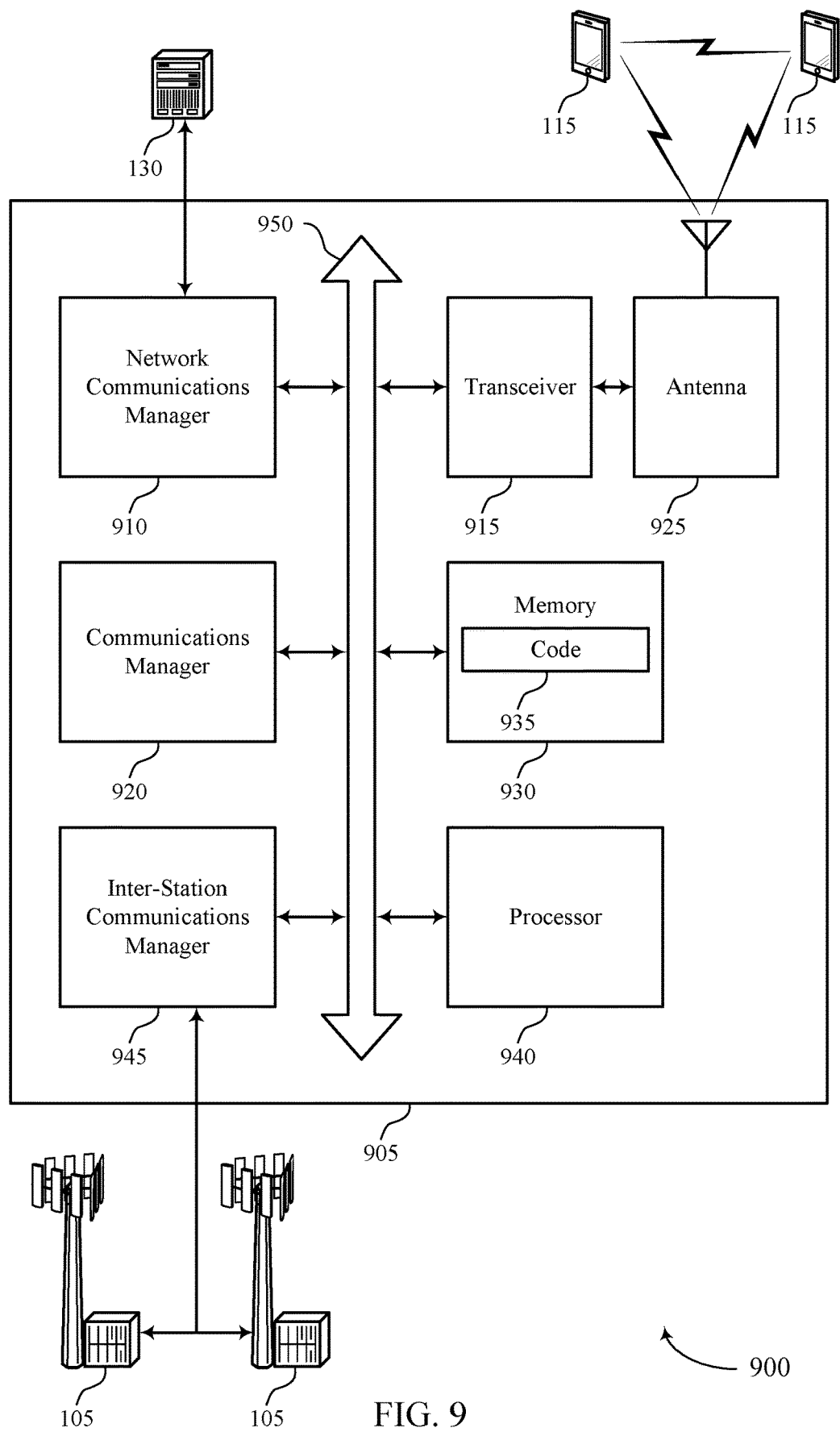
FIG. 9 shows a diagram of a system including a base station that supports contention window adjustment for new radio unlicensed/sidelink in accordance with aspects of the present disclosure.

FIG. 9 shows a diagram of a system 900 including a device 905 that supports contention window adjustment for new radio unlicensed/sidelink in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting contention window adjustment for new radio unlicensed/sidelink). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a transmitting device in accordance with examples as disclosed herein. For example, the communications manager 920 may be configured as or otherwise support a means for performing a first transmission to one or more receiving devices, the first transmission associated with a transmission type. The communications manager 920 may be configured as or otherwise support a means for determining a feedback response for the first transmission based on monitoring for feedback messages from the one or more receiving devices in response to the first transmission. The communications manager 920 may be configured as or otherwise support a means for selecting a contention window size for performing one or more subsequent transmissions based on the feedback response and the transmission type. The communications manager 920 may be configured as or otherwise support a means for performing the one or more subsequent transmissions in accordance with a clear channel assessment procedure using the selected contention window size.

By including or configuring the communications manager 920 in accordance with examples as described herein, the device 905 may support techniques for improving contention window size updates for CCA procedures performed on a sidelink channel based on the feedback response for a transmission and the corresponding transmission type of that transmission.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of contention window adjustment for new radio unlicensed/sidelink as described herein, or the processor 940 and the memory 930 may be otherwise configured to perform or support such operations.

Figure 10:
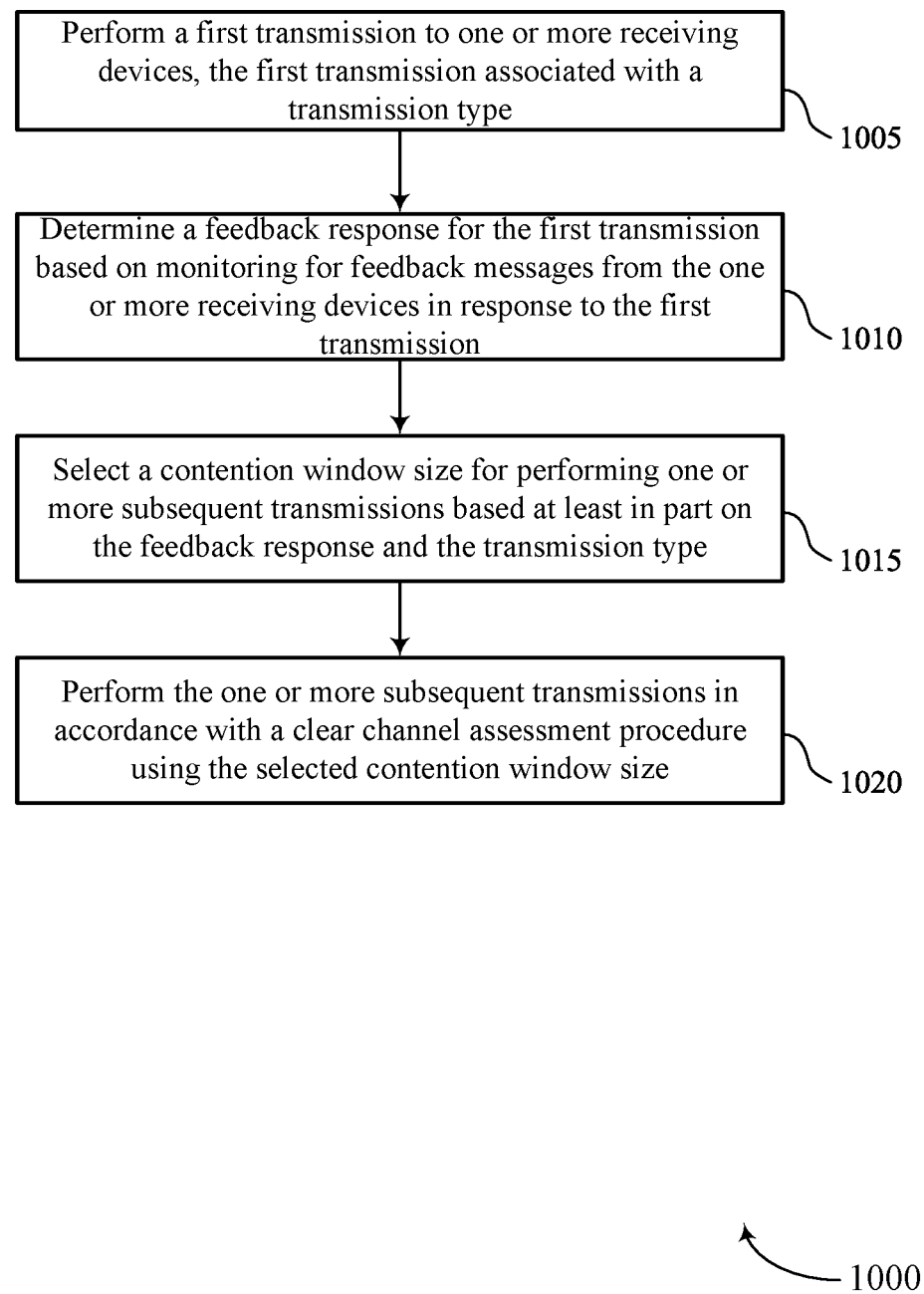
FIGS. 10 through 14 show flowcharts illustrating methods that support contention window adjustment for new radio unlicensed/sidelink in accordance with aspects of the present disclosure.

FIG. 10 shows a flowchart illustrating a method 1000 that supports contention window adjustment for new radio unlicensed/sidelink in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1005, the method may include performing a first transmission to one or more receiving devices, the first transmission associated with a transmission type. The operations of 1005 may be performed in accordance with examples as disclosed herein. In some examples, aspects of the operations of 1005 may be performed by a transmission manager 725 as described with reference to FIG. 7.

At 1010, the method may include determining a feedback response for the first transmission based on monitoring for feedback messages from the one or more receiving devices in response to the first transmission. The operations of 1010 may be performed in accordance with examples as disclosed herein. In some examples, aspects of the operations of 1010 may be performed by a feedback response manager 730 as described with reference to FIG. 7.

At 1015, the method may include selecting a contention window size for performing one or more subsequent transmissions based on the feedback response and the transmission type. The operations of 1015 may be performed in accordance with examples as disclosed herein. In some examples, aspects of the operations of 1015 may be performed by a contention window size 735 as described with reference to FIG. 7.

At 1020, the method may include performing the one or more subsequent transmissions in accordance with a clear channel assessment procedure using the selected contention window size. The operations of 1020 may be performed in accordance with examples as disclosed herein. In some examples, aspects of the operations of 1020 may be performed by a transmission manager 725 as described with reference to FIG. 7.

Figure 11:
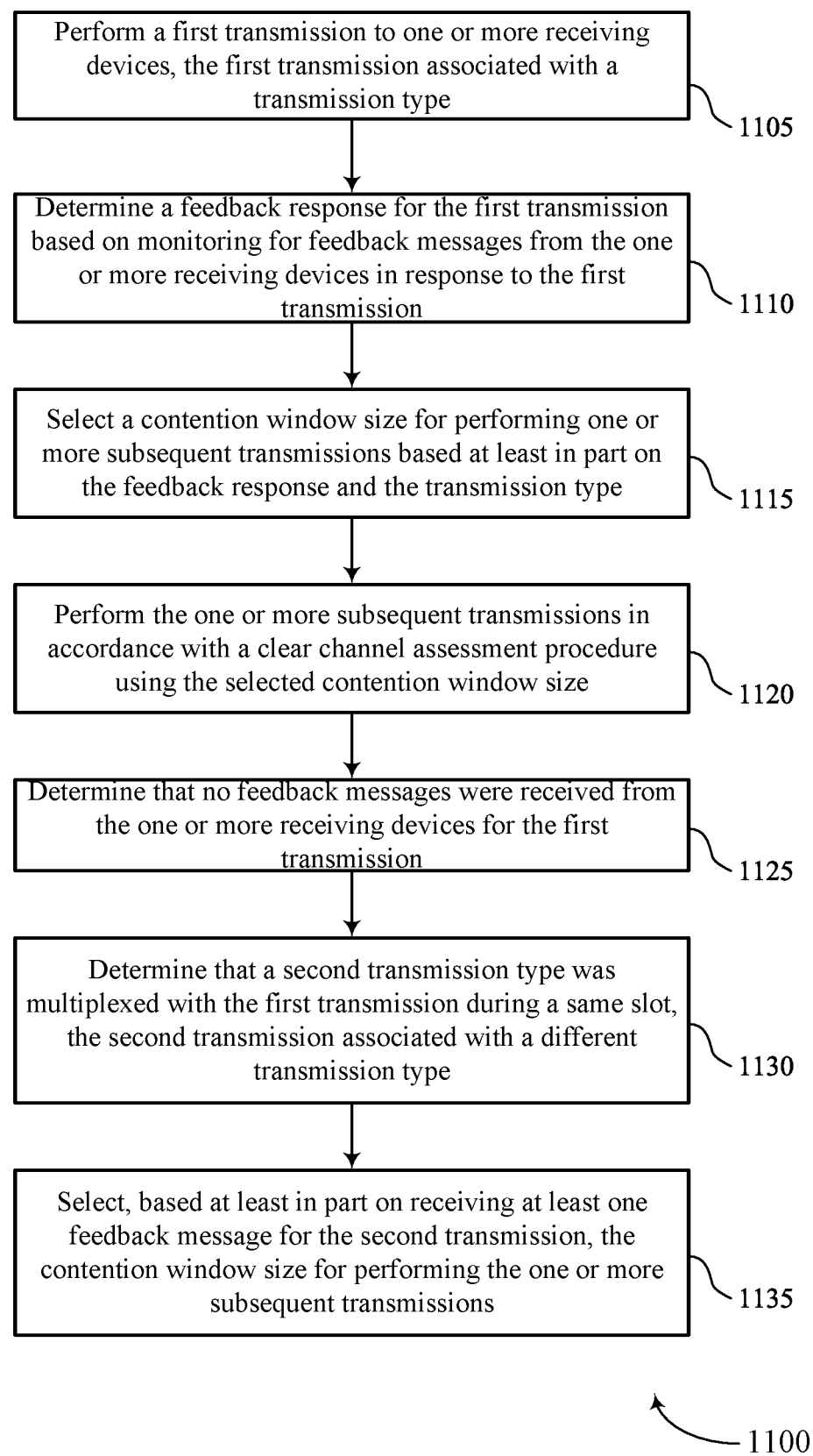

FIG. 11 shows a flowchart illustrating a method 1100 that supports contention window adjustment for new radio unlicensed/sidelink in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1105, the method may include performing a first transmission to one or more receiving devices, the first transmission associated with a transmission type. The operations of 1105 may be performed in accordance with examples as disclosed herein. In some examples, aspects of the operations of 1105 may be performed by a transmission manager 725 as described with reference to FIG. 7.

At 1110, the method may include determining a feedback response for the first transmission based on monitoring for feedback messages from the one or more receiving devices in response to the first transmission. The operations of 1110 may be performed in accordance with examples as disclosed herein. In some examples, aspects of the operations of 1110 may be performed by a feedback response manager 730 as described with reference to FIG. 7.

At 1115, the method may include selecting a contention window size for performing one or more subsequent transmissions based on the feedback response and the transmission type. The operations of 1115 may be performed in accordance with examples as disclosed herein. In some examples, aspects of the operations of 1115 may be performed by a contention window size 735 as described with reference to FIG. 7.

At 1120, the method may include performing the one or more subsequent transmissions in accordance with a clear channel assessment procedure using the selected contention window size. The operations of 1120 may be performed in accordance with examples as disclosed herein. In some examples, aspects of the operations of 1120 may be performed by a transmission manager 725 as described with reference to FIG. 7.

At 1125, the method may include determining that no feedback messages were received from the one or more receiving devices for the first transmission. The operations of 1125 may be performed in accordance with examples as disclosed herein. In some examples, aspects of the operations of 1125 may be performed by a connectionless groupcast transmission manager 740 as described with reference to FIG. 7.

At 1130, the method may include determining that a second transmission type was multiplexed with the first transmission during a same slot, the second transmission associated with a different transmission type. The operations of 1130 may be performed in accordance with examples as disclosed herein. In some examples, aspects of the operations of 1130 may be performed by a connectionless groupcast transmission manager 740 as described with reference to FIG. 7.

At 1135, the method may include selecting, based on receiving at least one feedback message for the second transmission, the contention window size for performing the one or more subsequent transmissions. The operations of 1135 may be performed in accordance with examples as disclosed herein. In some examples, aspects of the operations of 1135 may be performed by a connectionless groupcast transmission manager 740 as described with reference to FIG. 7.

Figure 12:
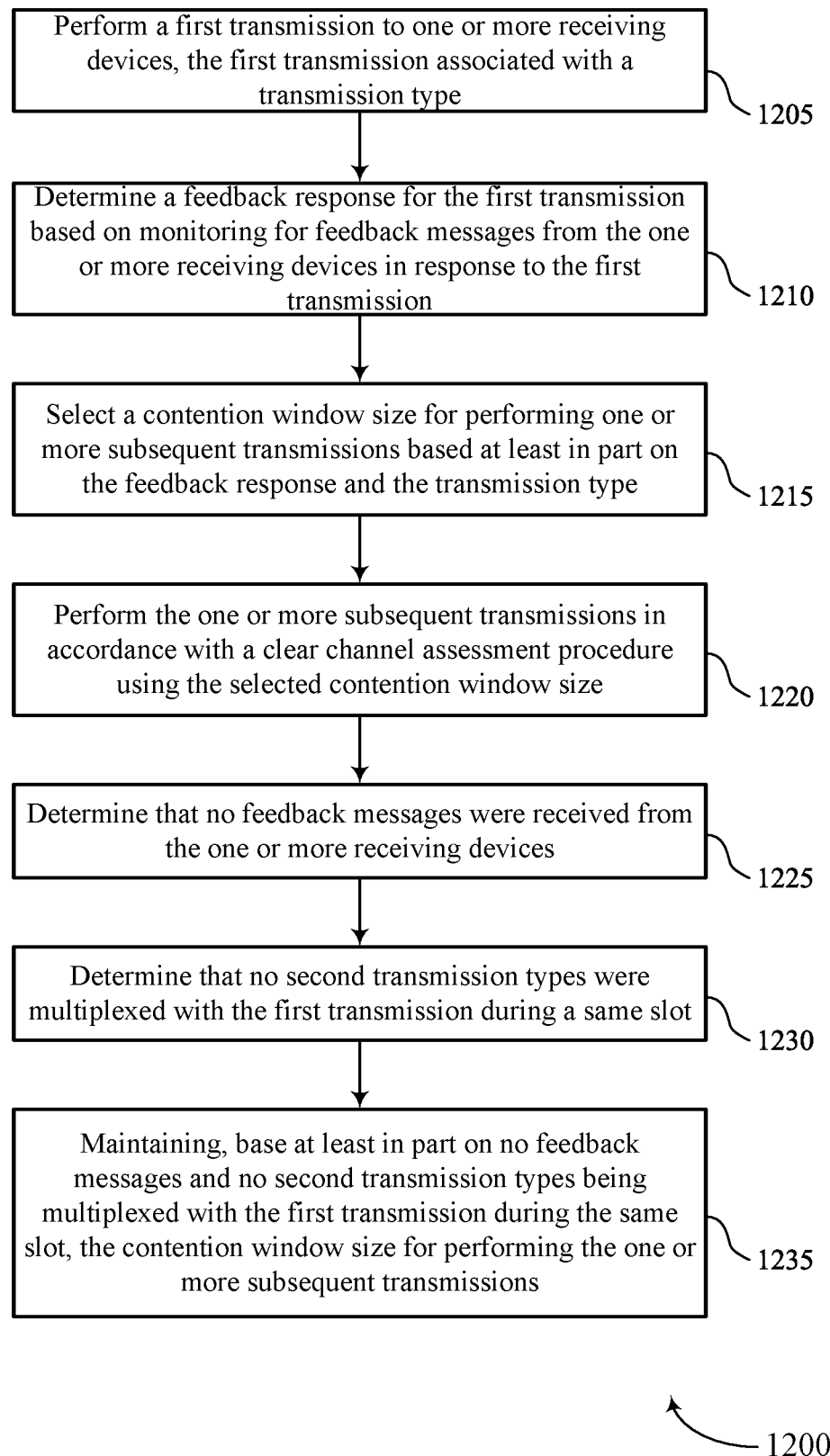

FIG. 12 shows a flowchart illustrating a method 1200 that supports contention window adjustment for new radio unlicensed/sidelink in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1205, the method may include performing a first transmission to one or more receiving devices, the first transmission associated with a transmission type. The operations of 1205 may be performed in accordance with examples as disclosed herein. In some examples, aspects of the operations of 1205 may be performed by a transmission manager 725 as described with reference to FIG. 7.

At 1210, the method may include determining a feedback response for the first transmission based on monitoring for feedback messages from the one or more receiving devices in response to the first transmission. The operations of 1210 may be performed in accordance with examples as disclosed herein. In some examples, aspects of the operations of 1210 may be performed by a feedback response manager 730 as described with reference to FIG. 7.

At 1215, the method may include selecting a contention window size for performing one or more subsequent transmissions based on the feedback response and the transmission type. The operations of 1215 may be performed in accordance with examples as disclosed herein. In some examples, aspects of the operations of 1215 may be performed by a contention window size 735 as described with reference to FIG. 7.

At 1220, the method may include performing the one or more subsequent transmissions in accordance with a clear channel assessment procedure using the selected contention window size. The operations of 1220 may be performed in accordance with examples as disclosed herein. In some examples, aspects of the operations of 1220 may be performed by a transmission manager 725 as described with reference to FIG. 7.

At 1225, the method may include determining that no feedback messages were received from the one or more receiving devices. The operations of 1225 may be performed in accordance with examples as disclosed herein. In some examples, aspects of the operations of 1225 may be performed by a connectionless groupcast transmission manager 740 as described with reference to FIG. 7.

At 1230, the method may include determining that no second transmission types were multiplexed with the first transmission during a same slot. The operations of 1230 may be performed in accordance with examples as disclosed herein. In some examples, aspects of the operations of 1230 may be performed by a connectionless groupcast transmission manager 740 as described with reference to FIG. 7.

At 1235, the method may include maintaining, based on no feedback messages and no second transmission types being multiplexed with the first transmission during the same slot, the contention window size for performing the one or more subsequent transmissions. The operations of 1235 may be performed in accordance with examples as disclosed herein. In some examples, aspects of the operations of 1235 may be performed by a connectionless groupcast transmission manager 740 as described with reference to FIG. 7.

Figure 13:
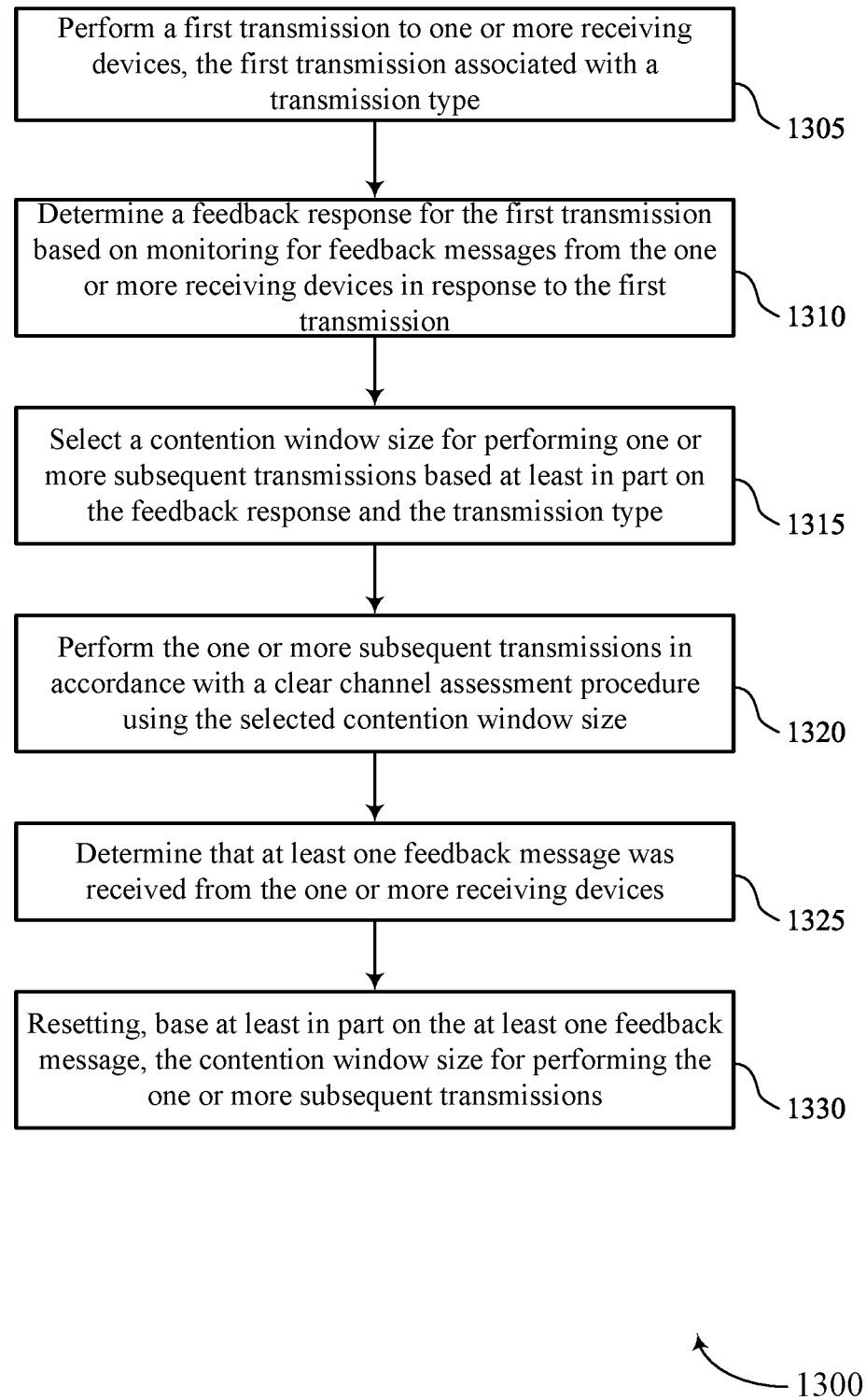

FIG. 13 shows a flowchart illustrating a method 1300 that supports contention window adjustment for new radio unlicensed/sidelink in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1305, the method may include performing a first transmission to one or more receiving devices, the first transmission associated with a transmission type. The operations of 1305 may be performed in accordance with examples as disclosed herein. In some examples, aspects of the operations of 1305 may be performed by a transmission manager 725 as described with reference to FIG. 7.

At 1310, the method may include determining a feedback response for the first transmission based on monitoring for feedback messages from the one or more receiving devices in response to the first transmission. The operations of 1310 may be performed in accordance with examples as disclosed herein. In some examples, aspects of the operations of 1310 may be performed by a feedback response manager 730 as described with reference to FIG. 7.

At 1315, the method may include selecting a contention window size for performing one or more subsequent transmissions based on the feedback response and the transmission type. The operations of 1315 may be performed in accordance with examples as disclosed herein. In some examples, aspects of the operations of 1315 may be performed by a contention window size 735 as described with reference to FIG. 7.

At 1320, the method may include performing the one or more subsequent transmissions in accordance with a clear channel assessment procedure using the selected contention window size. The operations of 1320 may be performed in accordance with examples as disclosed herein. In some examples, aspects of the operations of 1320 may be performed by a transmission manager 725 as described with reference to FIG. 7.

At 1325, the method may include determining that at least one feedback message was received from the one or more receiving devices. The operations of 1325 may be performed in accordance with examples as disclosed herein. In some examples, aspects of the operations of 1325 may be performed by a unicast transmission manager 745 as described with reference to FIG. 7.

At 1330, the method may include resetting, based on the at least one feedback message, the contention window size for performing the one or more subsequent transmissions. The operations of 1330 may be performed in accordance with examples as disclosed herein. In some examples, aspects of the operations of 1330 may be performed by a unicast transmission manager 745 as described with reference to FIG. 7.

Figure 14:
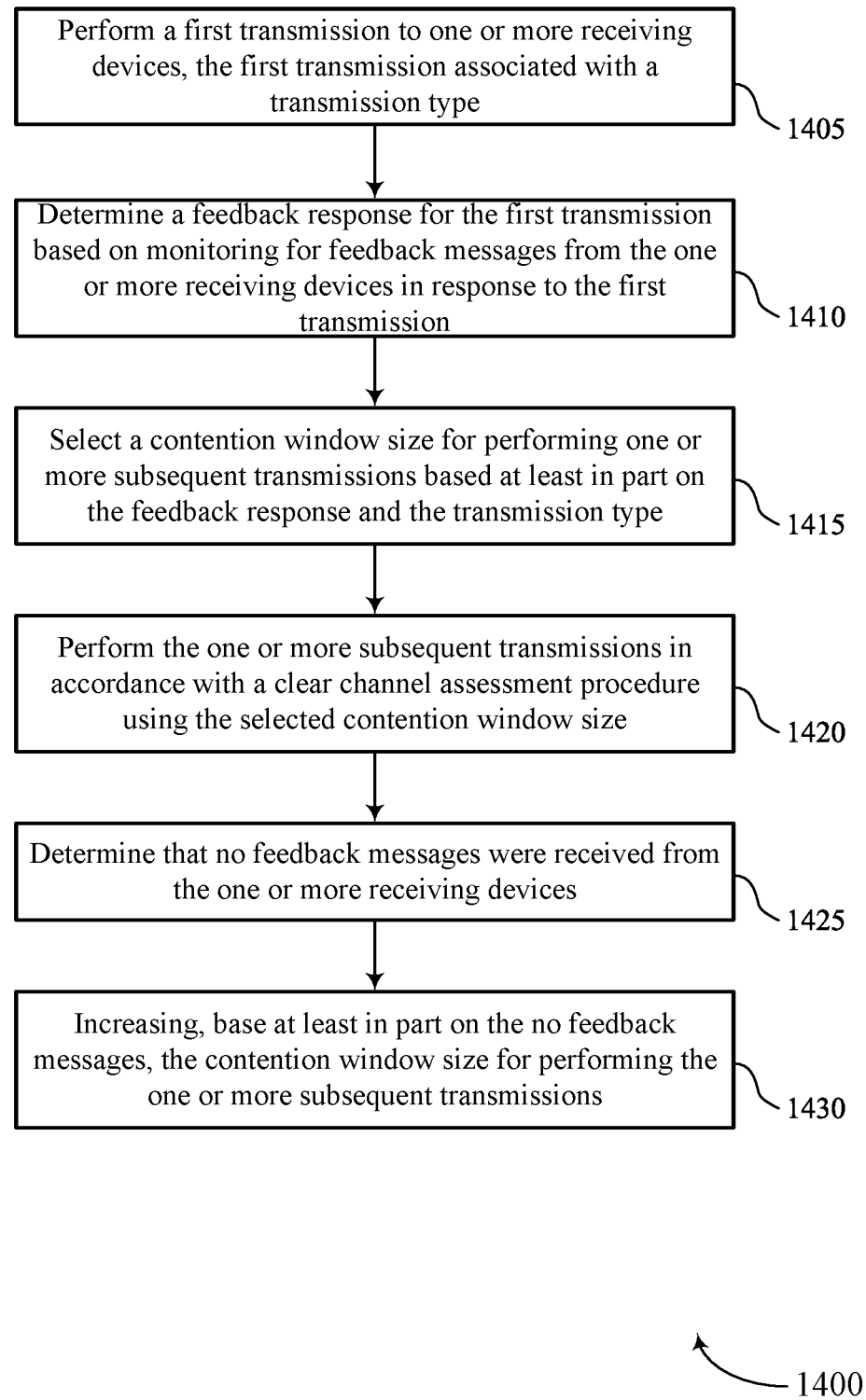

FIG. 14 shows a flowchart illustrating a method 1400 that supports contention window adjustment for new radio unlicensed/sidelink in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 9. In some examples, a UE or a base station may execute a set of instructions to control the functional elements of the UE or the base station to perform the described functions. Additionally, or alternatively, the UE or the base station may perform aspects of the described functions using special-purpose hardware.

At 1405, the method may include performing a first transmission to one or more receiving devices, the first transmission associated with a transmission type. The operations of 1405 may be performed in accordance with examples as disclosed herein. In some examples, aspects of the operations of 1405 may be performed by a transmission manager 725 as described with reference to FIG. 7.

At 1410, the method may include determining a feedback response for the first transmission based on monitoring for feedback messages from the one or more receiving devices in response to the first transmission. The operations of 1410 may be performed in accordance with examples as disclosed herein. In some examples, aspects of the operations of 1410 may be performed by a feedback response manager 730 as described with reference to FIG. 7.

At 1415, the method may include selecting a contention window size for performing one or more subsequent transmissions based on the feedback response and the transmission type. The operations of 1415 may be performed in accordance with examples as disclosed herein. In some examples, aspects of the operations of 1415 may be performed by a contention window size 735 as described with reference to FIG. 7.

At 1420, the method may include performing the one or more subsequent transmissions in accordance with a clear channel assessment procedure using the selected contention window size. The operations of 1420 may be performed in accordance with examples as disclosed herein. In some examples, aspects of the operations of 1420 may be performed by a transmission manager 725 as described with reference to FIG. 7.

At 1425, the method may include determining that no feedback messages were received from the one or more receiving devices. The operations of 1425 may be performed in accordance with examples as disclosed herein. In some examples, aspects of the operations of 1425 may be performed by a unicast transmission manager 745 as described with reference to FIG. 7.

At 1430, the method may include increasing, based on the no feedback messages, the contention window size for performing the one or more subsequent transmissions. The operations of 1430 may be performed in accordance with examples as disclosed herein. In some examples, aspects of the operations of 1430 may be performed by a unicast transmission manager 745 as described with reference to FIG. 7.

The following provides an overview of aspects of the present disclosure:

Aspect 1: A method for wireless communication at a transmitting device, comprising: performing a first transmission to one or more receiving devices, the first transmission associated with a transmission type; determining a feedback response for the first transmission based on monitoring for feedback messages from the one or more receiving devices in response to the first transmission; selecting a contention window size for performing one or more subsequent transmissions based at least in part on the feedback response and the transmission type; and performing the one or more subsequent transmissions in accordance with a CCA procedure using the selected contention window size.

Aspect 2: The method of aspect 1, wherein the transmission type comprises a connectionless-based groupcast transmission type, further comprising: determining that no feedback messages were received from the one or more receiving devices for the first transmission; determining that a second transmission was multiplexed with the first transmission during a same slot, the second transmission associated with a different transmission type; and selecting, based at least in part on receiving at least one feedback message for the second transmission, the contention window size for performing the one or more subsequent transmissions.

Aspect 3: The method of any of aspects 1 through 2, wherein the transmission type comprises a connectionless-based groupcast transmission type, further comprising: determining that no feedback messages were received from the one or more receiving devices; determining that no second transmission types were multiplexed with the first transmission during a same slot; and maintaining, based at least in part on no feedback messages and no second transmission types being multiplexed with the first transmission during the same slot, the contention window size for performing the one or more subsequent transmissions.

Aspect 4: The method of any of aspects 1 through 3, wherein the transmission type comprises a connectionless-based groupcast transmission type, further comprising: determining that at least one NACK feedback message was received from the one or more receiving devices; and resetting, based at least in part on the at least one NACK feedback message, the contention window size for performing the one or more subsequent transmissions.

Aspect 5: The method of any of aspects 1 through 4, wherein the transmission type comprises a unicast transmission type, further comprising: determining that at least one feedback message was received; and resetting, based at least in part on the at least one feedback message, the contention window size for performing the one or more subsequent transmissions.

Aspect 6: The method of aspect 5, wherein the at least one feedback message comprises at least one NACK feedback message, at least one ACK feedback message, or both.

Aspect 7: The method of any of aspects 1 through 6, wherein the transmission type comprises a unicast transmission type, further comprising: determining that no feedback messages were received; and increasing, based at least in part on the no feedback messages, the contention window size for performing the one or more subsequent transmissions.

Aspect 8: The method of any of aspects 1 through 7, wherein the transmission type comprises a unicast transmission type, further comprising: determining that at least one ACK feedback message was received; and resetting, based at least in part on the at least one ACK feedback message, the contention window size for performing the one or more subsequent transmissions.

Aspect 9: The method of any of aspects 1 through 8, wherein the transmission type comprises a unicast transmission type, further comprising: determining that no feedback messages were received or that a NACK feedback message was received; and increasing, based at least in part on the no feedback messages or the NACK feedback message, the contention window size for performing the one or more subsequent transmissions.

Aspect 10: The method of any of aspects 1 through 9, wherein the transmission type comprises a connection-based groupcast transmission type, further comprising: determining that at least one ACK feedback message, at least one NACK feedback message, or both, were received from the one or more receiving devices; and resetting, based at least in part on the at least one ACK feedback message, the at least one NACK feedback message, or both, the contention window size for performing the one or more subsequent transmissions.

Aspect 11: The method of aspect 10, further comprising: applying a weighting factor to one or more NACK feedback messages received from the one or more receiving devices, wherein resetting the contention window size for performing the one or more subsequent transmissions based at least in part on the weighting factor.

Aspect 12: The method of any of aspects 1 through 11, wherein the transmission type comprises a connection-based groupcast transmission type, further comprising: determining that at least one ACK feedback message, at least one NACK feedback message, or both, were received from the one or more receiving devices; determining that a ratio of ACK feedback messages, NACK messages, or both, to an expected feedback message count satisfies a threshold; and resetting, based at least in part on the ratio satisfying the threshold, the contention window size for performing the one or more subsequent transmissions.

Aspect 13: The method of aspect 12, further comprising: applying a weighting factor to each received NACK feedback message to obtain a discounted NACK feedback messages, wherein determining that a ratio satisfies the threshold is based at least in part on the ACK feedback message and the discounted NACK feedback messages.

Aspect 14: The method of any of aspects 1 through 13, wherein the transmission type comprises a connection-based groupcast transmission type, further comprising: determining that at least one ACK feedback message, at least one NACK feedback message, or both, were received from the one or more receiving devices; determining that a ratio of ACK feedback messages, NACK messages, or both, to an expected feedback message count fails to satisfy a threshold; and increasing, based at least in part on the ratio failing to satisfy the threshold, the contention window size for performing the one or more subsequent transmissions.

Aspect 15: The method of aspect 14, further comprising: applying a weighting factor to each received NACK feedback message to obtain a discounted NACK feedback messages, wherein determining that the ratio satisfies the threshold is based at least in part on the ACK feedback message and the discounted NACK feedback messages.

Aspect 16: The method of any of aspects 1 through 15, wherein the transmission type comprises a connection-based groupcast transmission type, further comprising: determining that at least one ACK feedback message was received from the one or more receiving devices; and resetting, based at least in part on the at least one ACK feedback message, the contention window size for performing the one or more subsequent transmissions.

Aspect 17: The method of any of aspects 1 through 16, wherein the transmission type comprises a connection-based groupcast transmission type, further comprising: determining that no ACK feedback messages were received from the one or more receiving devices; and increasing, based at least in part on no ACK feedback messages, the contention window size for performing the one or more subsequent transmissions.

Aspect 18: The method of any of aspects 1 through 17, wherein the transmission type comprises a mixed transmission type, further comprising: determining, for one or more transmission types of the mixed transmission types, that at least one ACK feedback message was received from the one or more receiving devices; applying, based at least in part on the transmission type of the mixed transmission type, a weighting factor to each ACK feedback message to obtain a weighted ACK metric; and resetting, based at least in part on the weighted ACK metric satisfying a threshold, the contention window size for performing the one or more subsequent transmissions.

Aspect 19: The method of aspect 18, wherein each transmission type of the mixed transmission type is associated with a same weighting factor or with different weighting factors.

Aspect 20: The method of any of aspects 18 through 19, wherein the mixed transmission type comprise a unicast transmission type, a connection-based groupcast transmission type, a connectionless-based groupcast transmission type, or a combination thereof.

Aspect 21: The method of any of aspects 1 through 20, wherein the transmission type comprises a mixed transmission type, further comprising: determining that no feedback messages were received from the one or more receiving devices; and maintaining, based at least in part on the no feedback messages, the contention window size for performing the one or more subsequent transmissions.

Aspect 22: The method of aspect 21, wherein the mixed transmission type comprise a unicast transmission type, a connection-based groupcast transmission type, a connectionless-based groupcast transmission type, or a combination thereof.

Aspect 23: An apparatus for wireless communication at a transmitting device, comprising a processor; memory coupled with the processor; and instructions stored in the memory and executable by the processor to cause the apparatus to perform a method of any of aspects 1 through 22.

Aspect 24: An apparatus for wireless communication at a transmitting device, comprising at least one means for performing a method of any of aspects 1 through 22.

Aspect 25: A non-transitory computer-readable medium storing code for wireless communication at a transmitting device, the code comprising instructions executable by a processor to perform a method of any of aspects 1 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a transmitting device, comprising:
   performing a first transmission to one or more receiving devices, the first transmission comprising a sidelink transmission associated with a groupcast transmission type;
   receiving feedback messages associated with the first transmission associated with the groupcast transmission type, wherein the feedback messages comprise acknowledgement feedback messages, negative-acknowledgement feedback messages, or both;
   selecting between resetting a contention window size for performing one or more subsequent transmissions to a minimum value or increasing the contention window size for performing the one or more subsequent transmissions, wherein the contention window size is reset based at least in part on one or more ratios being greater than a threshold, and the contention window size is increased based at least in part on the one or more ratios being less than the threshold, wherein the one or more ratios includes one or more of: a ratio of received acknowledgement feedback messages to an expected feedback message count, a ratio of received negative-acknowledgement feedback messages to the expected feedback message count, or a ratio of both received acknowledgement feedback messages and received negative-acknowledgement feedback messages to the expected feedback message count; and performing the one or more subsequent transmissions in accordance with a clear channel assessment procedure using the contention window size, the one or more subsequent transmissions comprising subsequent sidelink transmissions.

2. The method of claim 1, wherein the groupcast transmission type comprises a connectionless-based groupcast transmission type, further comprising:

determining that no feedback messages were received from the one or more receiving devices for the first transmission; and determining that a second transmission was multiplexed with the first transmission during a same slot, the second transmission associated with a different transmission type, wherein the one or more ratios are based at least in part on receiving at least one feedback message for the second transmission.

3. The method of claim 1, wherein the groupcast transmission type comprises a connectionless-based groupcast transmission type, further comprising:

receiving at least one negative-acknowledgement feedback message from the one or more receiving devices; and resetting, based at least in part on the at least one negative-acknowledgement feedback message, the contention window size for performing the one or more subsequent transmissions, wherein the one or more ratios are based at least in part on the at least one negative-acknowledgement feedback message.

4. The method of claim 1, wherein the groupcast transmission type comprises a connection-based groupcast transmission type, further comprising:

receiving at least one acknowledgement feedback message, at least one negative-acknowledgement feedback message, or both, from the one or more receiving devices; and resetting, based at least in part on the at least one acknowledgement feedback message, the at least one negative-acknowledgement feedback message, or both, the contention window size for performing the one or more subsequent transmissions, wherein the one or more ratios are based at least in part on the at least one acknowledgement feedback message, the at least one negative-acknowledgement feedback message, or both.

5. The method of claim 4, further comprising:

applying a weighting factor to one or more of the received negative-acknowledgement feedback messages, wherein resetting the contention window size for performing the one or more subsequent transmissions based at least in part on the weighting factor.

6. The method of claim 1, further comprising:

applying a weighting factor to each of the received negative-acknowledgement feedback messages to obtain a discounted negative-acknowledgement feedback messages, wherein determining that the one or more ratios are greater than the threshold is based at least in part on the received acknowledgement feedback messages and the discounted negative-acknowledgement feedback messages.

7. The method of claim 1, further comprising:

applying a weighting factor to each of the received negative-acknowledgement feedback messages to obtain a discounted negative-acknowledgement feedback messages, wherein determining that the one or more ratios are less than the threshold is based at least in part on the received acknowledgement feedback messages and the discounted negative-acknowledgement feedback messages.

8. The method of claim 1, wherein the groupcast transmission type comprises a connection-based groupcast transmission type, further comprising:

receiving at least one acknowledgement feedback message from the one or more receiving devices; and resetting, based at least in part on the at least one acknowledgement feedback message, the contention window size for performing the one or more subsequent transmissions, wherein the one or more ratios is based at least in part on the at least one acknowledgement feedback message.

9. The method of claim 1, wherein the groupcast transmission type comprises a connection-based groupcast transmission type, further comprising:

determining that no acknowledgement feedback messages were received from the one or more receiving devices; and increasing, based at least in part on the no acknowledgement feedback messages, the contention window size for performing the one or more subsequent transmissions, wherein the one or more ratios is based at least in part on failing to receive acknowledgment feedback messages.

10. The method of claim 1, wherein the groupcast transmission type comprises mixed transmission types, further comprising:

determining, for one or more transmission types of the mixed transmission types, that at least one acknowledgement feedback message was received from the one or more receiving devices;

applying, based at least in part on the groupcast transmission type of the mixed transmission types, a weighting factor to each acknowledgement feedback message to obtain a weighted acknowledgement metric; and resetting, based at least in part on the weighted acknowledgement metric satisfying a threshold, the contention window size for performing the one or more subsequent transmissions, wherein the one or more ratios is based at least in part on the at least one acknowledgment feedback message.

11. The method of claim 10, wherein each transmission type of the mixed transmission types is associated with a same weighting factor or with different weighting factors.

12. The method of claim 10, wherein the mixed transmission types comprise a unicast transmission type, a connection-based groupcast transmission type, a connectionless-based groupcast transmission type, or a combination thereof.

13. A transmitting device for wireless communication, comprising:

one or more processors;

one or more memory coupled with the one or more processors; and instructions stored in the one or more memories and executable by the one or more processors to cause the transmitting device to:

perform a first transmission to one or more receiving devices, the first transmission comprising a sidelink transmission associated with a groupcast transmission type;

receive feedback messages associated with the first transmission associated with the groupcast transmission type, wherein the feedback messages comprise acknowledgement feedback messages, negative-acknowledgement feedback messages, or both;

select between resetting a contention window size for performing one or more subsequent transmissions to a minimum value or increasing the contention window size for performing the one or more subsequent transmissions, wherein the contention window size is reset based at least in part on one or more ratios being greater than a threshold, and the contention window size is increased based at least in part on the one or more ratios being less than the threshold, wherein the one or more ratios includes one or more of: a ratio of received acknowledgement feedback messages to an expected feedback message count, a ratio of received negative-acknowledgement feedback messages to the expected feedback message count, or a ratio of both received acknowledgement feedback messages and received negative-acknowledgement feedback messages to the expected feedback message count; and perform the one or more subsequent transmissions in accordance with a clear channel assessment procedure using the contention window size, the one or more subsequent transmissions comprising subsequent sidelink transmissions.

14. The transmitting device of claim 13, wherein the groupcast transmission type comprises a connectionless-based groupcast transmission type, and wherein the instructions are executable by the processor to cause the transmitting device to:

determine that no feedback messages were received from the one or more receiving devices for the first transmission; and determine that a second transmission was multiplexed with the first transmission during a same slot, the second transmission associated with a different transmission type, wherein the one or more ratios is based at least in part on receiving at least one feedback message for the second transmission.

15. The transmitting device of claim 13, wherein the groupcast transmission type comprises a connectionless-based groupcast transmission type, and wherein the instructions are executable by the processor to cause the transmitting device to:

receive at least one negative-acknowledgement feedback message from the one or more receiving devices; and reset, based at least in part on the at least one negative-acknowledgement feedback message, the contention window size for performing the one or more subsequent transmissions, wherein the one or more ratios is based at least in part on the at least one negative-acknowledgement feedback message.

* * * * *